(12) United States Patent
Mochizuki

(10) Patent No.: US 9,922,403 B2
(45) Date of Patent: Mar. 20, 2018

(54) DISPLAY CONTROL APPARATUS, PROJECTION APPARATUS, DISPLAY CONTROL METHOD, AND NON-TRANSITORY COMPUTER READABLE MEDIUM

(71) Applicant: Panasonic Intellectual Property Management Co., Ltd., Osaka (JP)

(72) Inventor: Makoto Mochizuki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/969,357

(22) Filed: Dec. 15, 2015

(65) Prior Publication Data

US 2016/0203590 A1  Jul. 14, 2016

(30) Foreign Application Priority Data

Jan. 9, 2015 (JP) ................................. 2015-003479
Sep. 10, 2015 (JP) ................................. 2015-178574

(51) Int. Cl.
*G06T 5/00* (2006.01)
*B60K 35/00* (2006.01)
(Continued)

(52) U.S. Cl.
CPC .............. *G06T 5/003* (2013.01); *B60K 35/00* (2013.01); *G02B 27/01* (2013.01);
(Continued)

(58) Field of Classification Search
None
See application file for complete search history.

(56) References Cited

U.S. PATENT DOCUMENTS

2010/0214437 A1* 8/2010 Kim .................. H04N 5/21
  348/223.1
2011/0267374 A1* 11/2011 Sakata .................. G06F 3/013
  345/672

(Continued)

FOREIGN PATENT DOCUMENTS

| EP | 2650162 | 10/2013 |
| JP | 2002-264692 | 9/2002 |
| JP | 2007-230491 | 9/2007 |

OTHER PUBLICATIONS

The Extended European Search Report dated Jun. 14, 2016 for European Patent Application No. 15200299.4.
(Continued)

*Primary Examiner* — Ke Xiao
*Assistant Examiner* — Jed-Justin Imperial
(74) *Attorney, Agent, or Firm* — Greenblum & Bernstein, P.L.C.

(57) ABSTRACT

A display control apparatus includes an input unit that receives recognition results of a change in an environment surrounding a vehicle, and a controller that generates and outputs a control signal to an image generating apparatus such that the image generating apparatus generates a first predetermined image representing a first presentation image on a display medium. The controller controls the image generating apparatus such that an image sharpness gradually lowers from the first presentation image to a second presentation image lower in image sharpness than the first presentation image on the display medium during a predetermined duration of time, based on the received recognition results.

16 Claims, 25 Drawing Sheets

(51) Int. Cl.
  *G02B 27/01* (2006.01)
  *G06F 3/01* (2006.01)
  *G06K 9/00* (2006.01)

(52) U.S. Cl.
  CPC ..... *G02B 27/0101* (2013.01); *G02B 27/0179* (2013.01); *G06F 3/013* (2013.01); *G06K 9/00791* (2013.01); *G06T 5/002* (2013.01); *B60K 2350/1056* (2013.01); *B60K 2350/1084* (2013.01); *B60K 2350/1096* (2013.01); *B60K 2350/2013* (2013.01); *B60K 2350/2052* (2013.01); *B60K 2350/352* (2013.01); *B60K 2350/962* (2013.01); *B60K 2350/965* (2013.01); *G02B 2027/014* (2013.01); *G02B 2027/0118* (2013.01); *G02B 2027/0138* (2013.01); *G02B 2027/0183* (2013.01); *G02B 2027/0187* (2013.01); *G06T 2207/30252* (2013.01); *G06T 2207/30268* (2013.01)

(56) References Cited

U.S. PATENT DOCUMENTS

| | | | |
|---|---|---|---|
| 2013/0176329 A1* | 7/2013 | Toyoda | G06T 11/60 345/593 |
| 2013/0191791 A1* | 7/2013 | Rydenhag | G06F 3/04883 715/863 |
| 2013/0258488 A1* | 10/2013 | Hatakeyama | B60K 35/00 359/630 |
| 2014/0198189 A1* | 7/2014 | Aronsson | H04N 13/0484 348/51 |

OTHER PUBLICATIONS

Kengo Sato et. al, "Consideration of recognition of human's KEHAI in peripheral vision" the Institute of Image Information and Television Engineers (ITE), Japan, Technical Report vol. 33, No. 34, pp. 27-30, 2009 (Partial Translation).

* cited by examiner

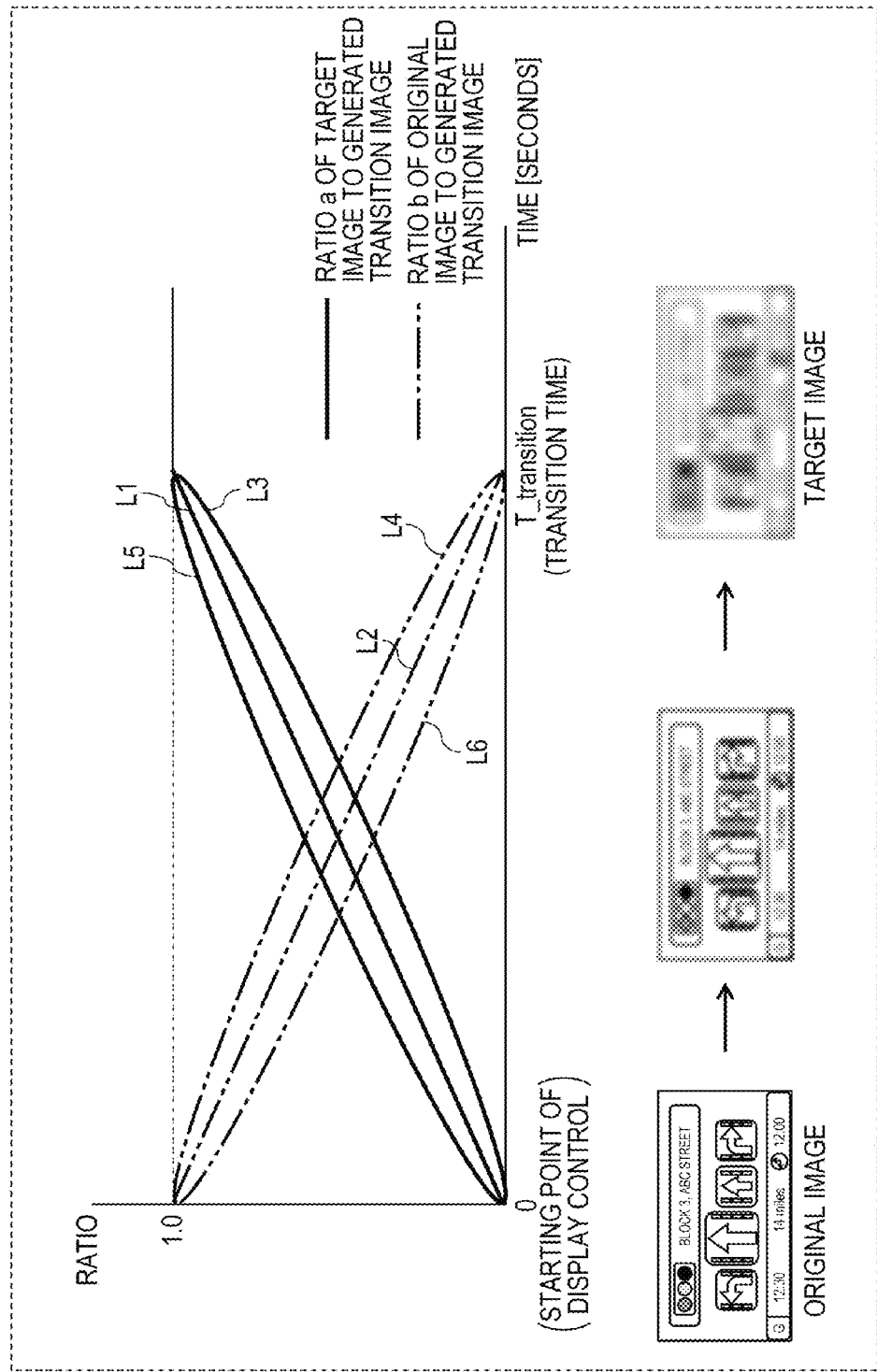

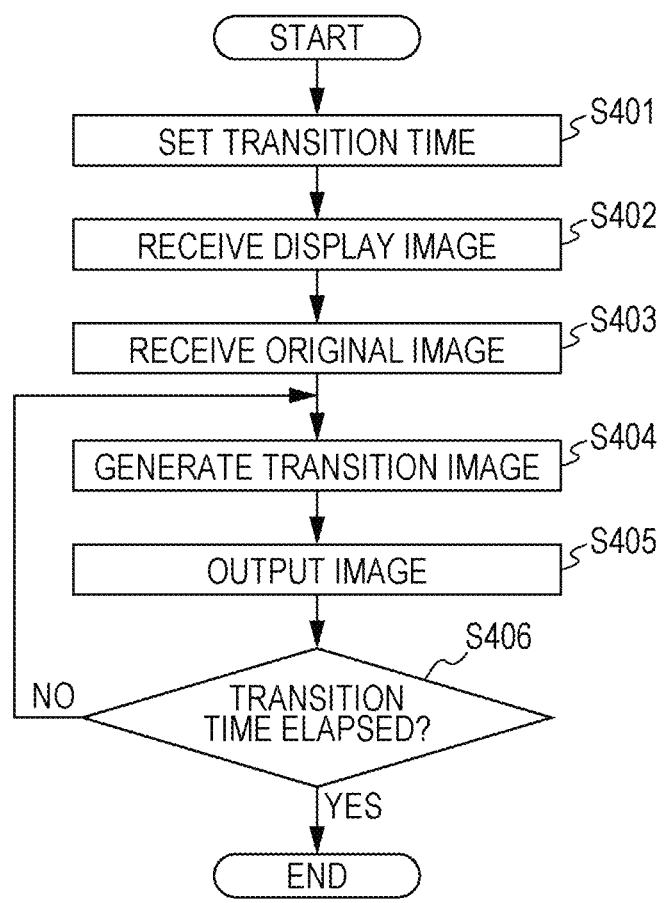

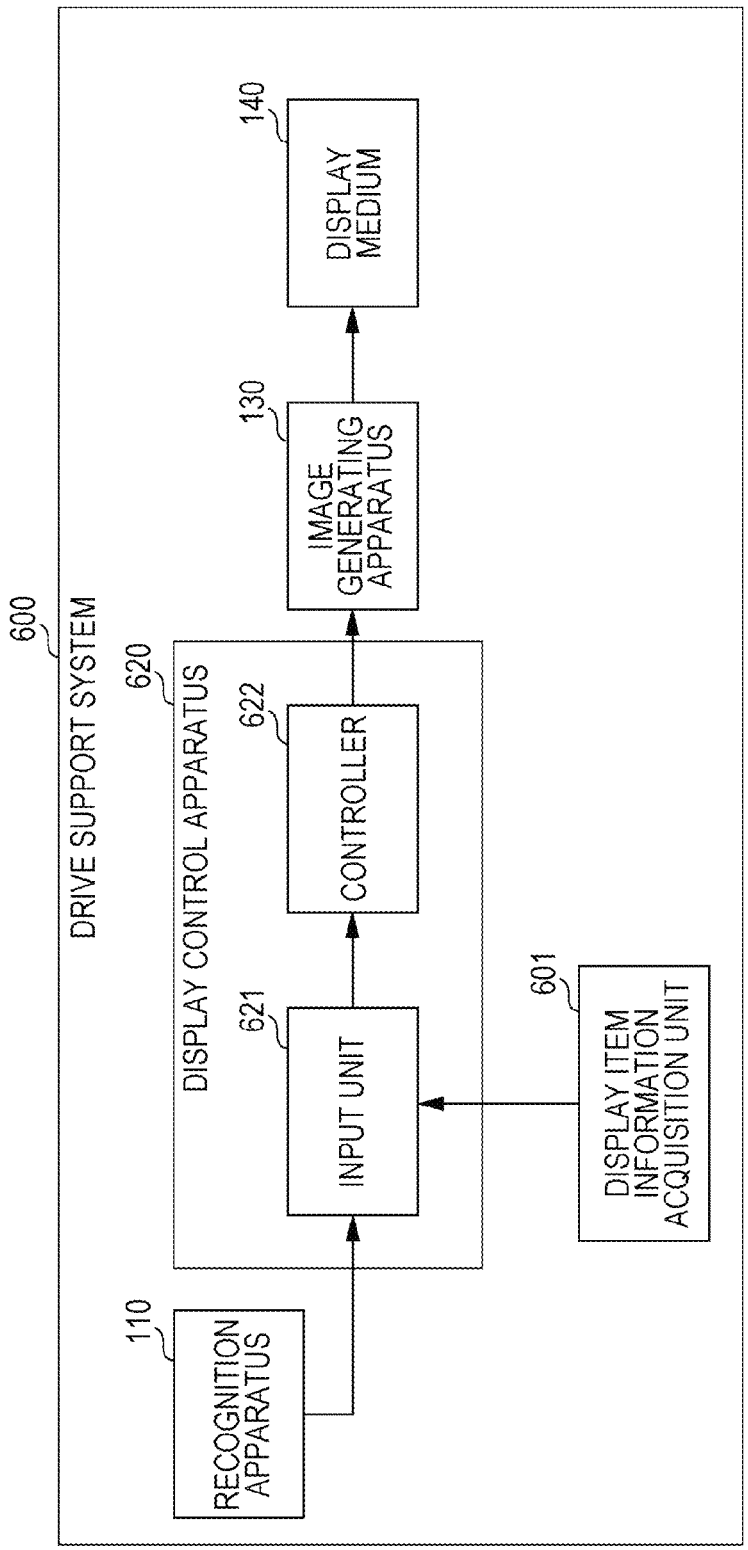

| DISPLAY ITEM | INFORMATION TYPE | DISPLAY FORM |
|---|---|---|
| INTERSECTION NAME (701) | GUIDE INFORMATION | ICON AND CHARACTER |
| GUIDING ARROW (702) | GUIDE INFORMATION | ICON |
| SPEED LIMIT INFORMATION (703) | DRIVE SUPPORT INFORMATION | ICON |
| TIME INFORMATION (704) | SERVICE INFORMATION | CHARACTER |

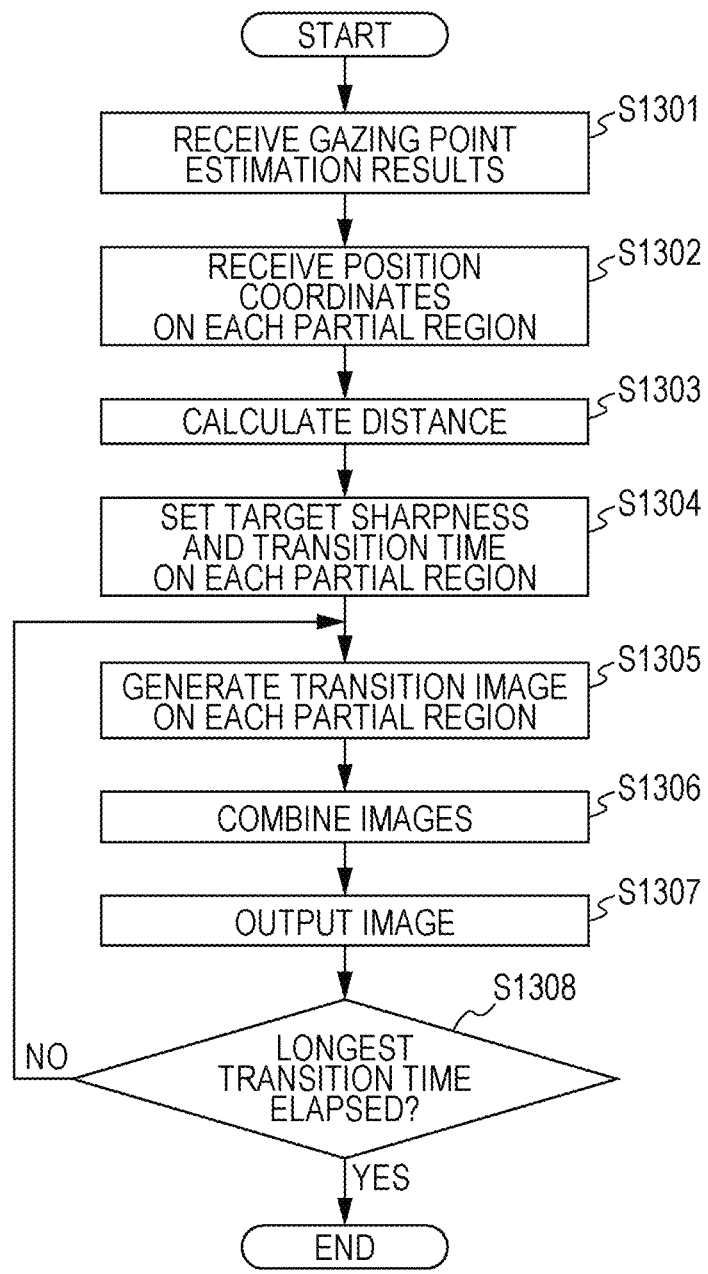

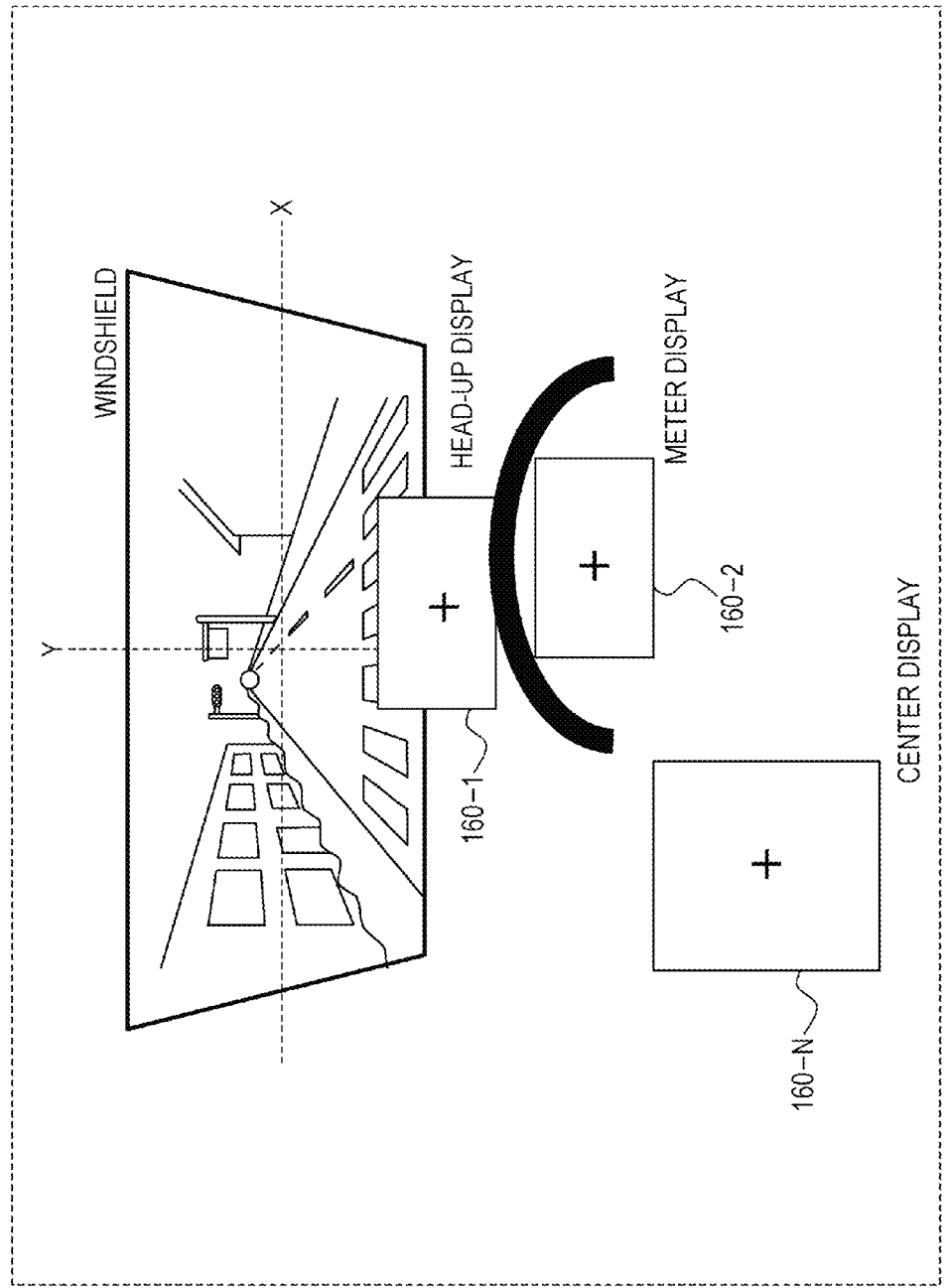

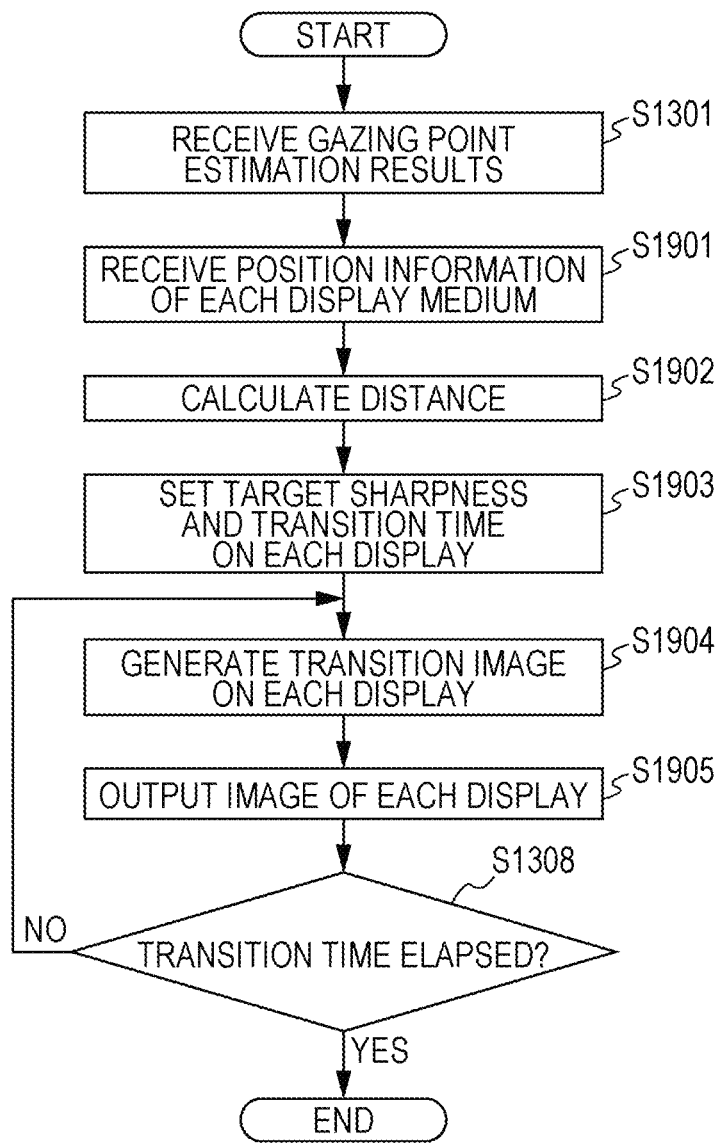

DISPLAY CONTROL APPARATUS, PROJECTION APPARATUS, DISPLAY CONTROL METHOD, AND NON-TRANSITORY COMPUTER READABLE MEDIUM

BACKGROUND

1. Technical Field

The present disclosure relates to a display control apparatus, a projection apparatus, a display control method, and a non-transitory computer readable medium.

2. Description of the Related Art

A driver may be occasionally obliged to gaze at a display screen for a long time while driving a vehicle because a variety of information is displayed on the display screen mounted on the vehicle. There is a possibility that a long time of the driver's gazing delays checking the status ahead of the vehicle driven by the driver, or makes it difficult for the driver to check the status. Japanese Unexamined Patent Application Publication No. 2002-264692 discloses an on-board display apparatus that reduces such a possibility.

The on-board display apparatus disclosed in Japanese Unexamined Patent Application Publication No. 2002-264692 erases contents displayed on a display if a distance between own vehicle and another vehicle ahead becomes short, and then retracts the display into an instrument panel so that the driver may not look at the display screen. In this way, the driver is alerted to the status ahead the vehicle.

However, since the on-board display apparatus of Japanese Unexamined Patent Application Publication No. 2002-264692 erases the display contents suddenly, a driver who looks ahead of the vehicle may have his attention caught by and be annoyed by a change of the display.

SUMMARY

One non-limiting and exemplary embodiment provides a display control apparatus, a projection apparatus, a display control method, and a non-transitory computer readable medium by contributing to safety driving in a manner free from annoying display change such as a sudden disappearance of display contents.

In one general aspect, the techniques disclosed here feature a display control apparatus. The display control apparatus includes an input unit that receives recognition results from a recognition apparatus that recognizes a change in an environment surrounding a vehicle, and a controller that outputs a control signal to an image generating apparatus, the control signal controlling the image generating apparatus in a manner such that an image sharpness gradually lowers from a first presentation image to a second presentation image lower in image sharpness than the first presentation image on a display medium during a predetermined duration of time, based on the received recognition results, the image generating apparatus generating a predetermined image corresponding to the first presentation image to be displayed on the display medium.

The disclosure thus contributes to safety driving in a manner free from annoying display change such as a sudden disappearance of display contents.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 illustrates the principle of a blending to generate a transition image;

FIG. 8 is a flowchart illustrating a sharpness recovery operation of the display control apparatus of the first embodiment of the disclosure;

FIG. 9 is a block diagram illustrating a configuration of a drive support system in accordance with a second embodiment of the disclosure;

FIG. 18 is a flowchart illustrating a sharpness lowering operation of the display control apparatus of the third embodiment of the disclosure;

FIG. 21 illustrates an example of display locations of multiple display media;

FIG. 22 is a flowchart illustrating a sharpness lowering operation of a display control apparatus of the fourth embodiment of the disclosure;

DETAILED DESCRIPTION

Figure 1:
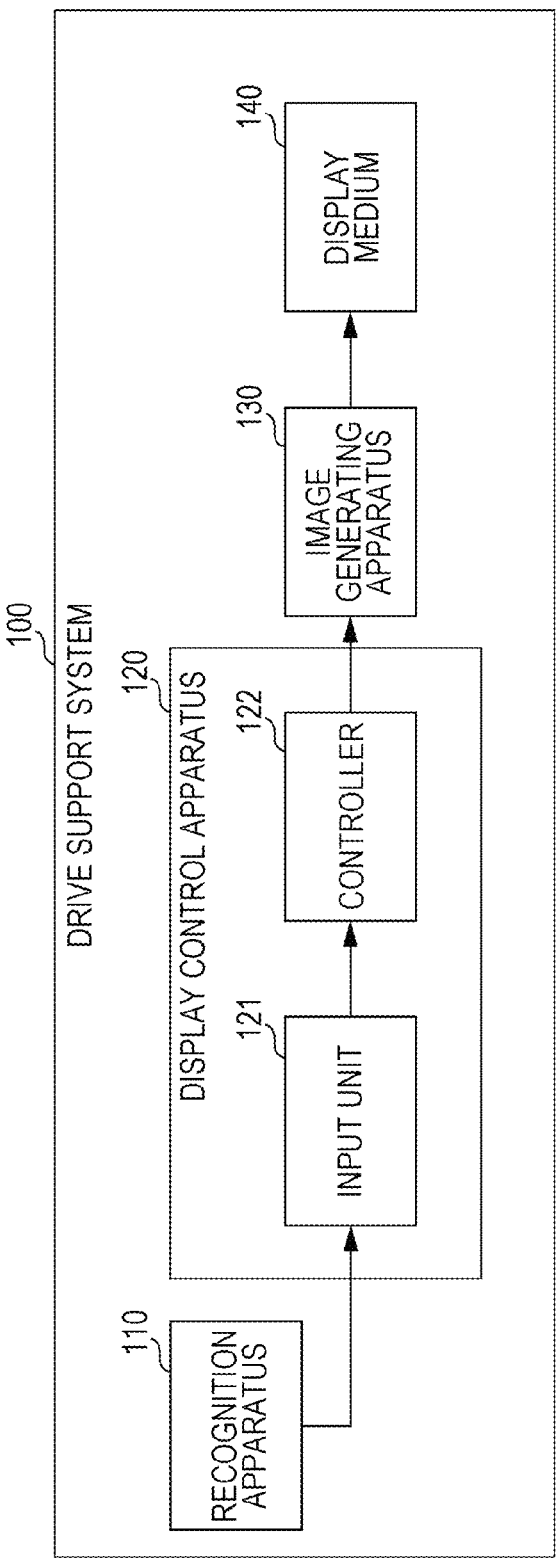
FIG. 1 is a block diagram illustrating a drive support system of a first embodiment of the disclosure.

A region of a field of view of the human eye having the highest acuteness of vision is referred to as a central visual field. The central visual field is believed to be 1 degree about the point of gaze. The region surrounding the central visual vision is referred to as a peripheral visual field. The acuteness of vision lowers as it is away from the point of gaze. Vision at an eccentric angle of 10 degrees lowers to be as high as about 20% of the acuteness of vision at the central vision ("Consideration of recognition of human's KEHAI in peripheral vision" Kengo SATO, Kazuhiko YAMAMOTO, Kunihito KATO, the Institute of Image Information and Television Engineers (ITE), Japan, Technical Report Col. 33, No. 34, 2009). In view of such visual performance, a display may be changed so that the display is recognized at the center of the visual field but is not recognized in the peripheral visual field. As long as a person gazes at the display, a change in the display is considered to be recognized.

The discloser has developed the technique described in the disclosure, focusing on the visual performance. The visibility of an image displayed on a display is reduced in a method in which the reduction goes unnoticed by the driver unless he or she carefully looks at it. This causes the driver to carefully look forward ahead of the vehicle.

The embodiments of the disclosure are described in detail with reference to the drawings. In the embodiments, elements having the same function are designated with the same reference numerals and the discussion thereof is not duplicated.

First Embodiment

FIG. 1 is a block diagram illustrating a configuration of a drive support system 100 of a first embodiment of the disclosure. In the first embodiment, the drive support system 100 is applied to vehicles.

The drive support system 100 includes a recognition apparatus 110, a display control apparatus 120, an image generating apparatus 130, and a display medium 140. The display control apparatus 120 includes an input unit 121 and a controller 122.

The drive support system 100 includes a detecting device (not illustrated). The detecting device mounted internal or external to a vehicle may be a sensing camera or a radar. If the detecting device is a sensing camera, the sensing camera photographs the foreground ahead of the vehicle. If the detecting device is a radar, the radar senses the environment surrounding the vehicle. The detecting device outputs information of the foreground image or sensing results to the recognition apparatus 110.

At predetermined regular intervals, the recognition apparatus 110 recognizes a change in the environment surrounding the vehicle having the drive support system 100 mounted thereon. More specifically, the recognition apparatus 110 recognizes a predetermined target appearing in the area surrounding the vehicle (for example, an area ahead of the vehicle) in response to the information output from the detecting device. The targets may include a moving object (such as a vehicle, person, bicycle, or motorcycle), a structure on a road (such as a road white line, road sign, road marking, curb stone, guardrail, traffic light, utility pole, or building). If the detecting device is a sensing camera, the recognition apparatus 110 performs pattern matching on peripheral information (such as the foreground image), and recognizes the target. If the detecting device is a radar, the recognition apparatus 110 extracts and recognizes a target through a recognition technique based on clustering. The recognition apparatus 110 outputs the recognition results to the input unit 121. The recognition results are information related to the moving object and the road structure, and include a distance between own vehicle and the moving object or a road structure, a relative speed, and a relative angle. The target recognition technique of the recognition apparatus 110 is one of related-art techniques and the detailed description thereof is omitted herein.

The recognition apparatus 110 may recognize weather, and illuminance, as a change in the environment surrounding the vehicle, in addition to the target.

The input unit 121 receives the recognition results output from the recognition apparatus 110, and then outputs the recognition results to the controller 122.

The controller 122 determines the necessity of the driver's taking a careful look ahead of the vehicle based on the recognition results output from the input unit 121. The necessity of the drive's taking careful look ahead of the vehicle is determined based on the collision risk between the vehicle and targets including another vehicle ahead of own vehicle. The determination method of the controller 122 is described in detail below.

The display control apparatus 120 may now start up, for example, the engine may be started. The controller 122 then controls the image generating apparatus 130 such that an image to be displayed on the display medium 140 (hereinafter referred to as a "standard image") is displayed on the display medium 140 until the display control apparatus 120 determines that a driver is to carefully look forward ahead of the vehicle. When the display control apparatus 120 determines that the driver is to carefully look forward ahead of the vehicle, the controller 122 sets a target sharpness of the image to be displayed on the display medium 140 to be lower than an initial sharpness, and then controls the image generating apparatus 130 until the set target sharpness is reached. The target sharpness is set in response to a manner of reducing the image sharpness. For example, if the sharpness is lowered by smoothing the image through image processing, a filter size of a smoothing filter (to be discussed later) is used as the target sharpness. On the other hand, upon determining that the driver's need to carefully look forward ahead of the vehicle is not so high, the controller 122 sets the target sharpness of the image to be displayed on the display medium 140 to the initial sharpness and controls the image generating apparatus 130 until the set target sharpness is reached. More specifically, the controller 122 controls the image generating apparatus 130 by outputting to the image generating apparatus 130 a signal to control generation of image data.

The sharpness may be interchangeable with the degree of blurriness in a sense. If the controller 122 determines that the driver is to carefully look forward ahead of the vehicle, the controller 122 sets the degree of blurriness of a target in the image to be displayed on the display medium 140 to be higher than an initial degree of blurriness, and controls the image generating apparatus 130 until the set target degree of blurriness is reached. On the other hand, if the controller 122 determines that the driver's need to carefully look forward ahead of the vehicle is not so high, the controller 122 sets the degree of blurriness of a target in the image to be displayed on the display medium 140 to be the initial degree of blurriness. The controller 122 controls the image generating apparatus 130 until the set target degree of blurriness is reached.

In order to reach the target sharpness set by the controller 122, the image generating apparatus 130 successively generates transition images with the sharpness gradually changed, and outputs the generated transition images to the display medium 140.

The display medium 140 displays the transition image generated by the image generating apparatus 130 and used on board. The display media 140 may include a head-up display (HUD), an electronic room-mirror display, an electronic side mirror display, a meter display, a center display, a head-mounted display (HMD), a helmet-mounted display (HMD), smart glasses, and other dedicated display.

The HUD may be a windshield of a vehicle, or a glass surface, or a plastic surface (such as a combiner). The HUD may be a door window glass, or a rear window glass. In each case, the image is displayed on the display medium 140.

The HUD may be a transmissive display disposed on the outside surface or the inside surface of the windshield. For example, the transmissive display may be a transmissive organic electroluminescent (EL) display or a transmissive display manufactured of glass that emits light in response to irradiation of light of a particular wavelength. The driver looks forward at the foreground while viewing the display on the transmissive display.

In the first embodiment, the display control apparatus 120 including the image generating apparatus 130 may be used as a projection apparatus. The projection apparatus may further include the display medium 140.

Figure 2:
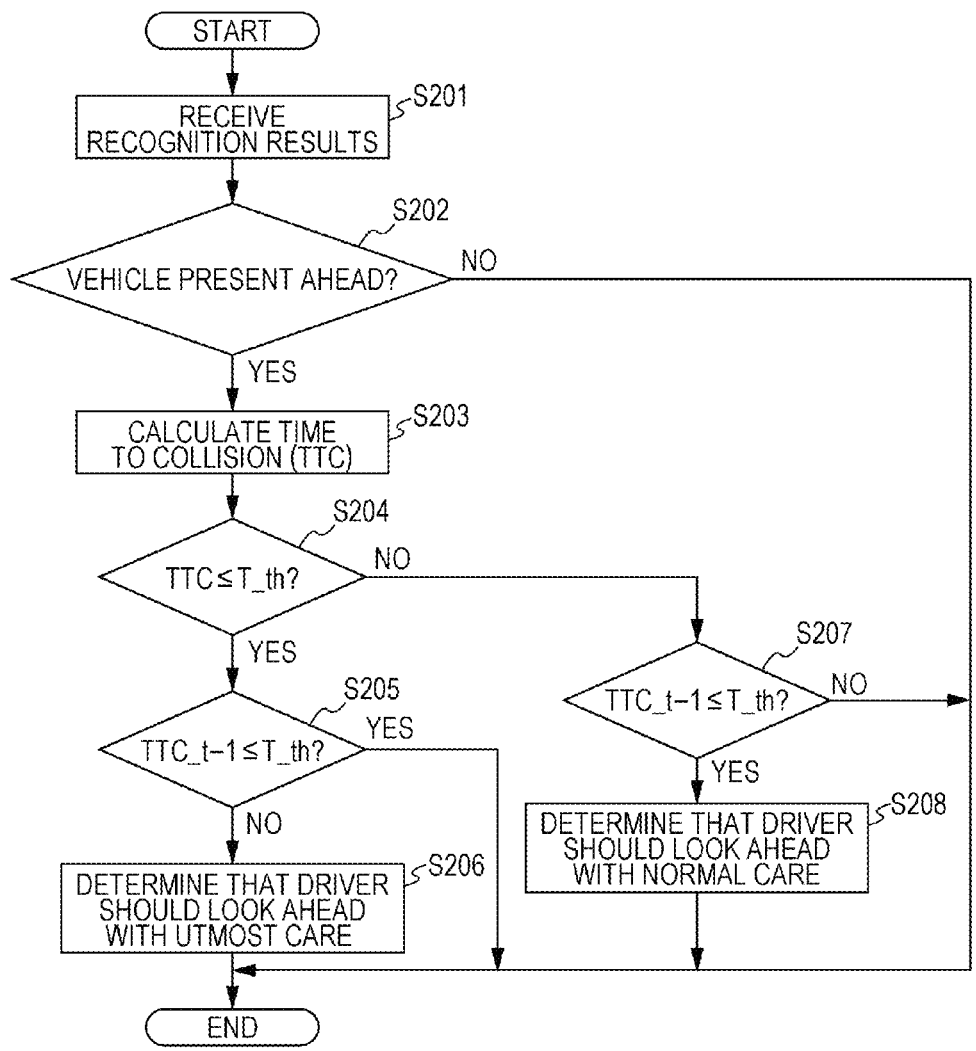
FIG. 2 is a flowchart illustrating a determination operation of a controller of FIG. 1.

The determination operation of the controller 122 is described below. FIG. 2 is a flowchart illustrating a determination operation of the controller 122 of FIG. 1. The determination operation may be performed at predetermined time intervals, such as every 10 ms or 100 ms, and repeated while the vehicle engine is on.

The input unit 121 receives the recognition results of a target in an area surrounding the vehicle (step S201). The controller 122 determines in response to the recognition results whether another vehicle (hereinafter referred to as a front vehicle) is present ahead of own vehicle (step S202). If there is a front vehicle (yes branch from step S202), the controller 122 calculates time to collision (TTC) before colliding with the front vehicle (step S203). TTC is calculated in accordance with D/ΔV (seconds) where D in meters represents a relative distance between the vehicle and the front vehicle and ΔV represents a relative speed of the vehicle with respect to the front vehicle. If there is no front vehicle (no branch from step S202), the controller 122 ends the determination operation.

The controller 122 determines whether TTC is below a threshold value T_th to determine the collision risk (step S204). If TTC is equal to or below the threshold value T_th (yes branch from step S204), the controller 122 determines that there is a risk of collision, and proceeds to step S205. If TTC is above the threshold value T_th (no branch from step S204), the controller 122 determines that there is no risk of collision, and proceeds to step S207.

Upon determining that TTC is equal to or below the threshold value T_th (yes branch from step S204), the controller 122 determines whether TTC at one interval earlier (hereinafter referred to as "TTC_t−1") is equal to or below the threshold value T_th (step S205).

Upon determining that TTC_t−1 at one interval earlier is above the threshold value T_th (no branch from step S205), there is no risk of collision at one interval earlier, but a risk of collision occurs first at the present time point. The controller 122 determines that the driver is to carefully look forward ahead of the vehicle (hereinafter also described as "there is a driver's necessity of carefully looking forward ahead of the vehicle") (step S206), and ends the determination operation.

Upon determining in step S205 that TTC_t−1 at one interval earlier is equal to or below the threshold value T_th (yes branch from step S205), there is a risk of collision both at present time point and at one interval earlier. In this case, there is no change in the driver's necessity of carefully looking forward ahead of the vehicle, and the controller 122 ends the determination operation.

If TTC is above the threshold value T_th in step S204 (no branch from step S204), the controller 122 determines whether TTC_t−1 at one interval earlier is equal to or below the threshold value T_th (step S207).

If it is determined in step S207 that TTC_t−1 at one interval earlier is equal to or below the threshold value T_th (yes branch from step S207), there is a risk of collision at one interval earlier but there is no risk of collision at the present time point. The controller 122 determines that the driver's need to carefully look forward ahead of the vehicle is not so high (also described as "the driver is free from carefully looking forward ahead of the vehicle") (step S208), and ends the determination operation.

If it is determined in step S207 that TTC_t−1 at one intersection earlier is above the threshold value T_th (no branch from step S207), there is no risk of collision at one interval earlier and at the present time point. The controller 122 ends the determination operation. The threshold value T_th in step S204, step S205, and step S207 may be 4 seconds, or 5 seconds, for example.

Figure 3:
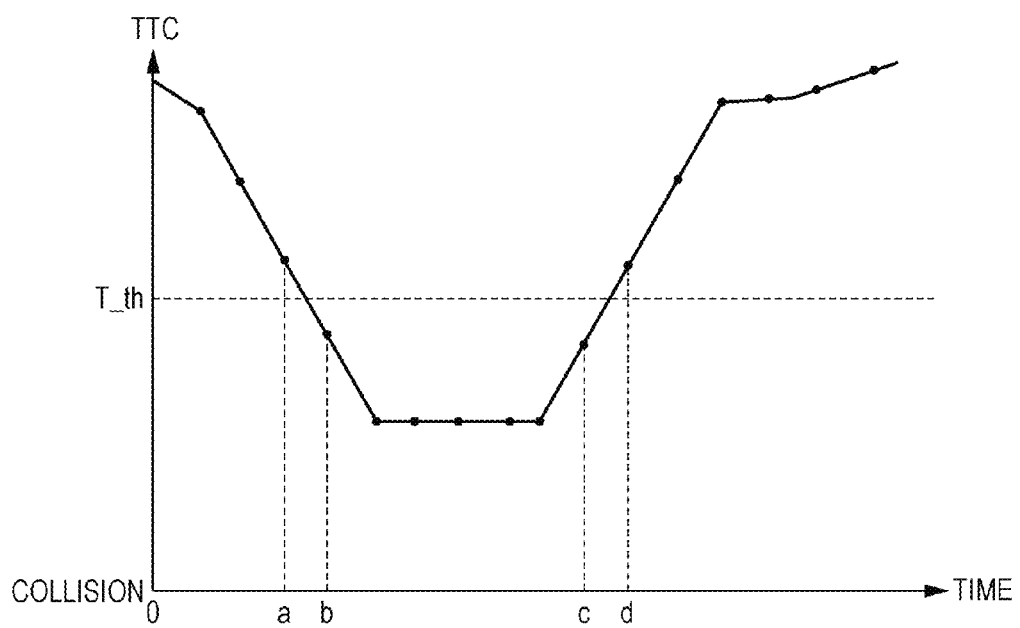
FIG. 3 illustrates an example of change of time to collision (TTC) along with time elapse.

FIG. 3 illustrates an example of change of time to collision (TTC) with time elapse. In FIG. 3, the ordinate represents TTC while the abscissa represents time. A line graph of FIG. 3 results from connecting TTCs, each of which is calculated and plotted each time the operation of FIG. 2 is performed at predetermined time intervals.

Referring to FIG. 3, TTC falls below the threshold value T_th in a time duration from time a to time b and rises above the threshold value T_th in a time duration from time c to time d.

If the determination operation of FIG. 2 is performed at time b, the determination result in step S204 is affirmative (yes branch), and the determination result in step S205 is non-affirmative (no branch). As a result, the controller 122 determines that the driver is to carefully look forward ahead of the vehicle.

If the determination operation of FIG. 2 is performed at time d, the determination result in step S204 is non-affirmative (no branch), and the determination result in step S207 is affirmative (yes branch). As a result, the controller 122 determines that the driver is free from carefully looking forward ahead of the vehicle.

Upon determining that the driver is to carefully look forward ahead of the vehicle, the controller 122 sets the target sharpness of the image to be displayed on the display medium 140 to be lower than the initial sharpness of the standard image, and controls the image generating apparatus 130 until the set target sharpness is reached. Upon determining that the driver is free from carefully looking forward ahead of the vehicle, the controller 122 sets the target sharpness of the image to be displayed on the display medium 140 to be the initial sharpness of the standard image, and controls the image generating apparatus 130 until the set target sharpness is reached.

A method of lowering the sharpness of the image is described below. A variety of methods of lowering the sharpness of the image is available, such as low-pass filtering the image or smoothing the image. In the first embodiment, the smoothing method of the image is used.

The image generating apparatus 130 lowers the sharpness of the image using a smoothing filter configured to smooth an image. For example, the image generating apparatus 130 calculates the mean value of pixel values in a particular region, such as 3×3 pixels or 5×5 pixels centered on a target pixel, and sets the calculated mean value to be the pixel value of the target pixel. In this way, the image generating apparatus 130 generates a blurred image that looks like an image out of focus. In the smoothing filter, by increasing a range of smoothing (such as three pixels, or five pixels, and hereinafter referred to as referred to as a "filter size"), the image generating apparatus 130 may set a higher degree of smoothing.

Figure 4A:
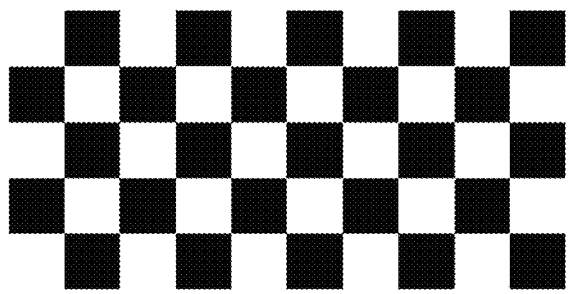
FIG. 4A through FIG. 4C illustrate how a pattern image is smoothed.
Figure 4B:
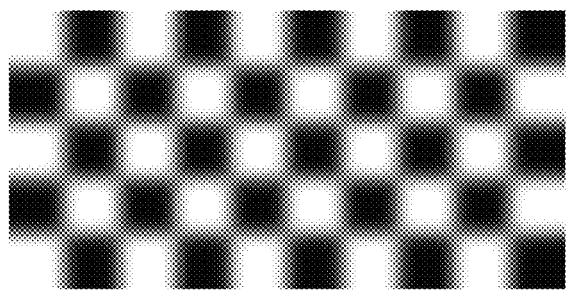
Figure 4C:
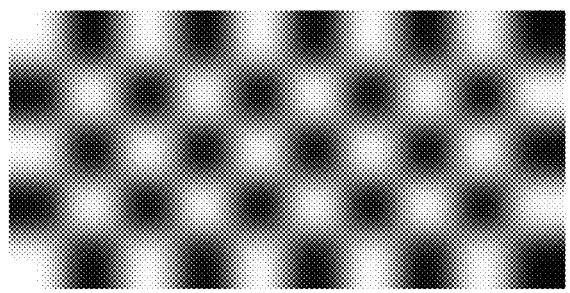
Figure 5A:
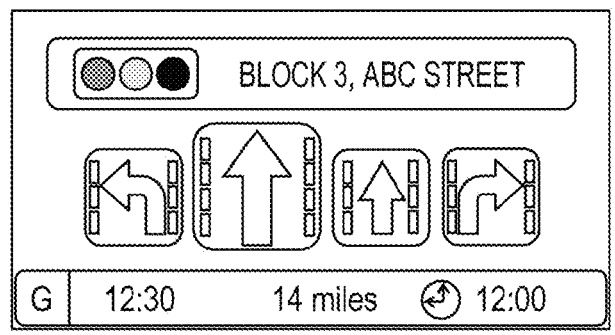
FIG. 5A through FIG. 5C illustrate how an example of an image displayed on a display medium is smoothed.
Figure 5B:
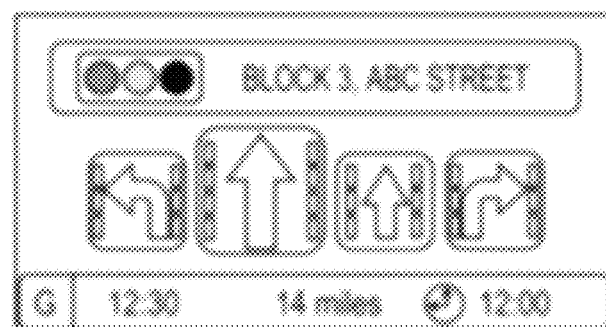
Figure 5C:

FIG. 4A through FIG. 4C illustrate how a pattern image is smoothed. FIG. 5A through FIG. 5C illustrate how an example of an image displayed on the display medium 140 is smoothed. FIG. 4A illustrates an original version of a pattern image. FIG. 4B illustrates an image that is obtained by performing a low degree of smoothing operation on the original image of FIG. 4A and has a relatively high degree of sharpness (a relatively low degree of blurriness). FIG. 4C illustrates an image that is obtained by performing a high degree of smoothing operation on the original image of FIG. 4A and has a low degree of sharpness (a high degree of blurriness). FIG. 5A illustrates an original image to be displayed on the display medium 140. FIG. 5B illustrates an image that is obtained by performing a low degree of smoothing operation on the original image of FIG. 5A and has a relatively high degree of sharpness (a relatively low degree of blurriness). FIG. 5C illustrates an image that is obtained by performing a high degree of smoothing operation on the original image of FIG. 5A and has a low degree of sharpness (a high degree of blurriness).

The image of FIG. 4C may be obtained by performing a low degree of smoothing operation on the image of FIG. 4B. This is true of the image of FIG. 5C.

Figure 6:
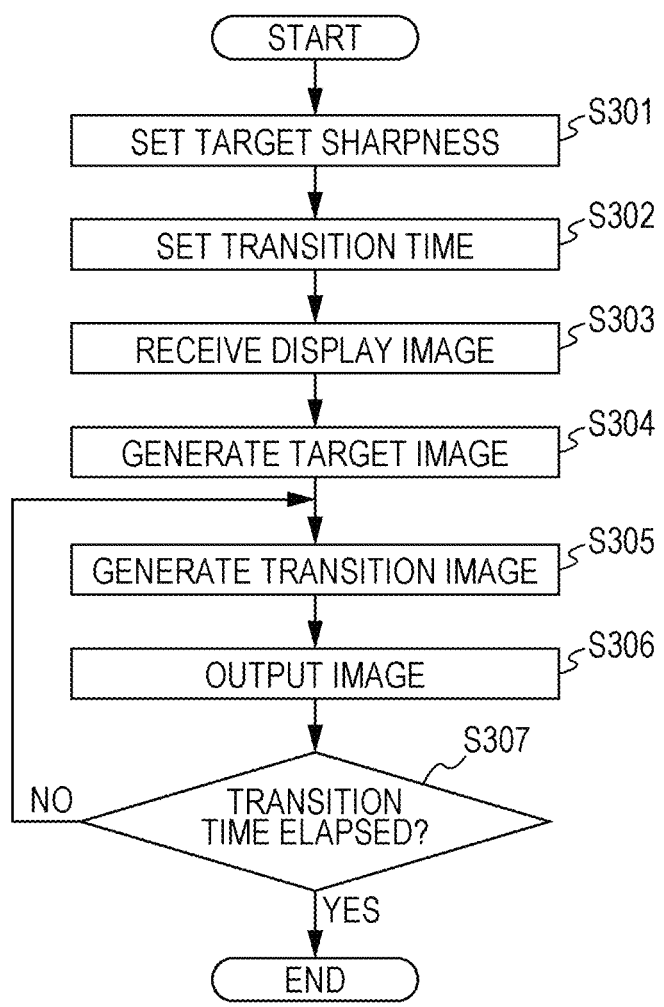
FIG. 6 is a flowchart illustrating a sharpness lowering operation of a display control apparatus in accordance with the first embodiment of the disclosure.

The sharpness lowering operation to be performed by the display control apparatus 120 is described with reference to FIG. 6. FIG. 6 is a flowchart illustrating the sharpness lowering operation of the display control apparatus 120 in accordance with the first embodiment of the disclosure. The controller 122 performs the sharpness lowering operation upon determining that the driver is to carefully look forward ahead of the vehicle.

The controller 122 specifies the filter size of a smoothing filter as a target sharpness intended on the image (step S301). For example, the controller 122 specifies a value, such as 3 pixels, 5 pixels, or 11 pixels.

The controller 122 sets transition time T_transition that is consumed to transition the image currently displayed on the display medium 140 to an image having the target sharpness, for example, a value of 1 second, 1.5 seconds, or 2 seconds (step S302).

If the controller 122 determines that the driver is free from carefully looking forward ahead of the vehicle, the image generating apparatus 130 receives a display image displayed on the display medium 140 as an original image (step S303), and generates a target image having the target sharpness into which the original image is smoothed (step S304).

The image generating apparatus 130 generates a transition image to transition from the original image to the target image (step S305). A technique, such as a blending, which blends the original image and the target image at a predetermined ratio may be used to generate a transition image. The transition image generation operation is described in detail below.

The image generating apparatus 130 outputs the generated transition image to the display medium 140 (step S306), and determines whether the transition time T_transition has elapsed since the start of the generation of the transition image (step S307). If the transition time T_transition has not elapsed (no branch from step S307), processing returns to step S305. If the transition time T_transition has elapsed (yes branch from step S307), the controller 122 ends the sharpness lowering operation.

The transition image generation operation is described with reference to FIG. 7. In FIG. 7, the abscissa represents time and the ordinate represents ratios of the original image and the target image to the target image generated through the a blending. Solid lines L1, L3, and L5 represent a ratio a of the target image to the generated transition image, and two-dot-dash lines L2, L4, and L6 represent a ratio b of the original image to the generated transition image.

As illustrated in FIG. 7, the ratio b of the original image to the generated transition image is 1.0 at time 0, and the ratio a of the target image to the generated transition image is 0. In contrast, the ratio b of the original image to the generated transition image is 0 at the time elapse of the transition time T_transition, and the ratio a of the target image to the generated transition image is 1.0 at the time elapse of the transition time T_transition. During time between time 0 to the transition time T_transition, the ratio b of the original image decreases from 1.0 to 0, and the ratio a of the target image increases from 0 to 1.0. At any time point, the ratio a+the ratio b (the ratio a represented by the solid line L1+the ratio b represented by the two-dot-dash line L2, or the ratio a represented by the solid line L3+the ratio b represented by the two-dot-dash line L4, or the ratio a represented by the solid line L5+the ratio b represented by the two-dot-dash line L6) equals 1.0. Referring to FIG. 7, the ratio b of the original image to the generated transition image, and the ratio a of the target image to the generated transition image increase or decrease linearly. As long as, however, a transition image is not noticed by the driver who is carefully looking forward ahead of the vehicle, the increase or decrease of the ratios does not necessarily have to be linear.

The image generating apparatus 130 generates the transition image by varying the blending ratios of the original image and the target image. Let b_t be the ratio of the original image to the transition image at a given time point, and let a_t be the ratio of the target image to the transition image at the given time point, a pixel value at coordinates (x,y) in the transition image is calculated in accordance with the formula of the original image (x,y)×b_t+the target image (x,y)×a_t.

A sharpness recovery operation performed by the display control apparatus 120 is described below with reference to FIG. 8. FIG. 8 is a flowchart illustrating the sharpness recovery operation of the display control apparatus 120 of the first embodiment of the disclosure. Upon determining that the driver is free from carefully looking forward ahead of the vehicle, the controller 122 performs the sharpness recovery operation described below.

The controller 122 sets the transition time T_transition to recover the sharpness of the original image prior to lowering sharpness from the image having a low sharpness currently displayed on the display medium 140. For example, the controller 122 sets a value of 1 second, 1.5 seconds, or 2 seconds, as the transition time (step S401). The transition time T_transition is set to be a value in order for the driver not to notice a change in the display during the sharpness recovery.

The image generating apparatus 130 receives data of the display image currently displayed on the display medium 140 (step S402), and also receives data of the original image prior to lowering the sharpness (step S403).

The image generating apparatus 130 generates a transition image on the way from the currently displayed image to the original image (step S404), and outputs the generated transition image to the display medium 140 (step S405). The transition image is generated using a technique, such as the a blending that blends the currently displayed image and the original image at a predetermined ratio.

The image generating apparatus 130 determines whether the set transition time T_transition has elapsed since the start of the generation of the transition image (step S406). If the transition time T_transition has not elapsed (no branch from step S406), processing returns to step S404. If the transition time T_transition has elapsed (yes branch from step S406), the controller 122 ends the sharpness recovery operation.

If the driver is to carefully look forward ahead of the vehicle in the drive support system 100, the sharpness of the image displayed on the display medium 140 is decreased. In this way, the driver who looks at the image displayed on the display medium 140 notices the change in the display, and starts to carefully look forward ahead of the vehicle. On the other hand, the driver carefully looks forward ahead of the vehicle but looks at the image displayed on the display medium 140 in the driver's peripheral visual field does not senses in the image displayed on the display medium 140 the sharpness change that decreases or recovers over a predetermined transition time. The driver does not pay attention to the display medium 140. As a result, the drive support system 100 does not cause a display change annoying to the driver, such as a sudden disappearance of the contents of display, frees the driver from the practice of nervous attention to the display, and contributes to safety driving.

TTC is used to determine whether the driver is to carefully look forward ahead of the vehicle. The disclosure is not limited to this method. A distance D meters to a vehicle ahead may be used. The controller 122 may determine that the driver is to carefully look forward ahead of the vehicle if the distance D is below a predetermined threshold value. Alternatively, upon determining based on TTC or the distance D to the vehicle ahead, that the driver is to carefully look forward ahead of the vehicle, the controller 122 calculates a rate of change (ΔTTC or ΔD) of TTC or the distance D to the vehicle ahead per unit time. If the rate of change is higher, the controller 122 determines that the risk of collision is higher, and then sets the transition time T_transition to be shorter than a predetermined time.

Second Embodiment

FIG. 9 is a block diagram illustrating a configuration of a drive support system 600 in accordance with a second embodiment of the disclosure. The difference of the drive support system 600 of FIG. 9 from the drive support system 100 of FIG. 1 is that the drive support system 600 includes a newly added display item information acquisition unit 601, a display control apparatus 620 in place of the display control apparatus 120, and an input unit 621 and a controller 622 respectively in place of the input unit 121 and the controller 122.

Figures 10A, 10B:
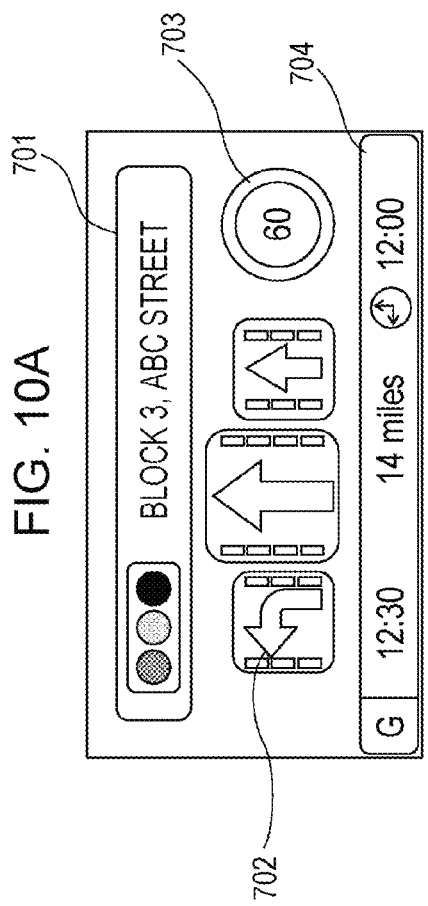
FIG. 10A and FIG. 10B illustrate information display items.

The display item information acquisition unit 601 acquires a display item (hereinafter referred to as "display item information") forming a display image to be displayed on the display medium 140, and outputs the acquired display item information to the input unit 621. FIG. 10A and FIG. 10B illustrate an example of display items 701 through 704 forming the display images, and an example of information acquired by the display item information acquisition unit 601.

The display item information acquisition unit 601 acquires, as information related to the display items 701 through 704, information including information type (guide information, drive support information, and service information), and display form (icons and characters).

The input unit 621 receives the display item information from the display item information acquisition unit 601, and outputs the display item information to the controller 622.

The controller 622 sets the target sharpness and the transition time based on the information of each display item included in the display item information. The guide information indicates directions or the name of a present location. The drive support information is information the driver uses to check periodically for safety driving, or information the driver uses to respond within a relatively short period of time. For example, the drive support information includes traffic information (traffic congestion information or accident information) and information about intersections known for a high rate of traffic accidents. The service information includes present time, the distance to a destination, and time to go to the destination.

If the controller 622 determines that the driver is to carefully look forward ahead of the vehicle, the controller 622 sets the target sharpness of the image displayed on the display medium 140 to be lower, and controls the image generating apparatus 130 until the set target sharpness is reached. On the other hand, if the controller 622 determines that the driver's need to carefully look forward ahead of the vehicle is not very high, the controller 622 sets the target sharpness of the image displayed on the display medium 140 to be higher, and controls the image generating apparatus 130 until the set target sharpness is reached. The controller 622 modifies the transition time in the sharpness recovery operation depending on the information type output from the display item information acquisition unit 601.

In the second embodiment, a projection apparatus including the display control apparatus 620 and the image generating apparatus 130 may be configured. The projection apparatus may further include the display medium 140.

Figure 11:
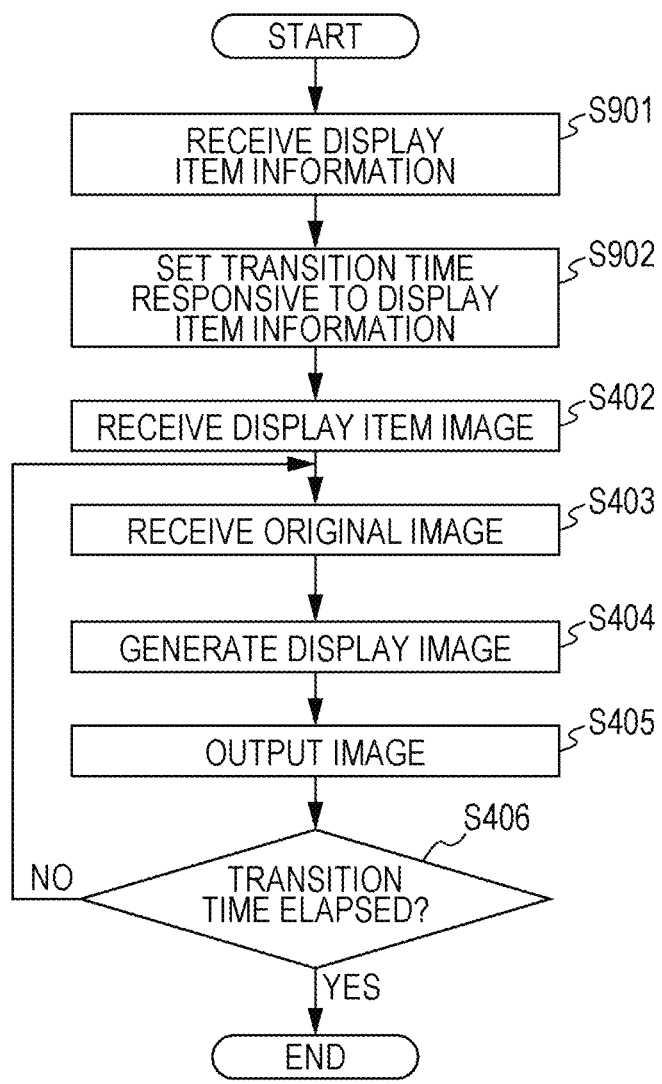
FIG. 11 is a flowchart illustrating a sharpness recovery operation of a display control apparatus of the second embodiment of the disclosure.

The sharpness recovery operation performed by the display control apparatus 620 is described with reference to FIG. 11. FIG. 11 is a flowchart illustrating the sharpness recovery operation of the display control apparatus 620 of the second embodiment of the disclosure. In FIG. 11, elements identical to those illustrated in FIG. 8 are designated with the same reference numerals and the discussion thereof is omitted herein.

The input unit 621 receives the display item information from the display item information acquisition unit 601 (step S901). The controller 622 sets the transition time in response to the display item information received by the input unit 621 (step S902). For example, if the information type included in the display item information is the drive support information, the controller 622 sets the transition time to be shorter. In the discussion of the first embodiment, the transition time T_transition to recover sharpness is set to be 2 seconds, 2.5 seconds, or 3 seconds, for example. If the information type is the drive support information, the transition time is set to be shorter than the transition time in other information type and causes the driver to notice the change less likely. For example, the value may be 1 second, 1.5 seconds, or 2 seconds.

Figure 12A:
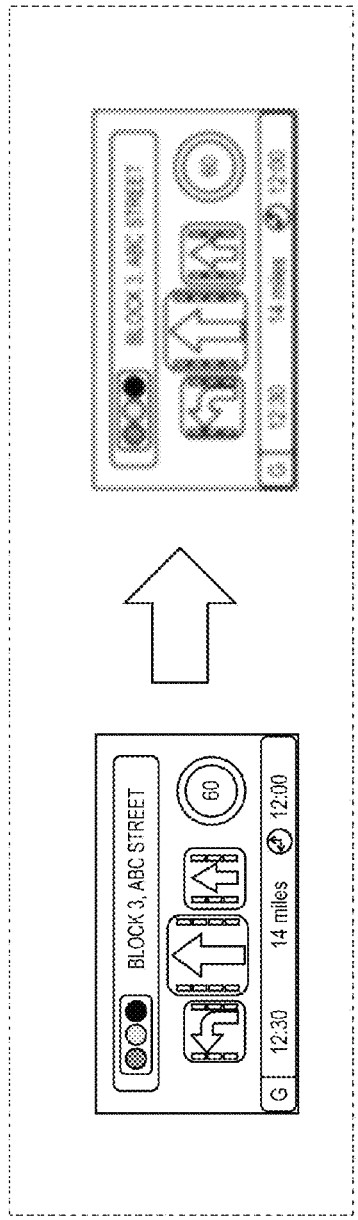
FIG. 12A illustrates a sharpness lowering operation of the second embodiment of the disclosure and FIG. 12B illustrates a sharpness recovery operation of the second embodiment of the disclosure.
Figure 12B:
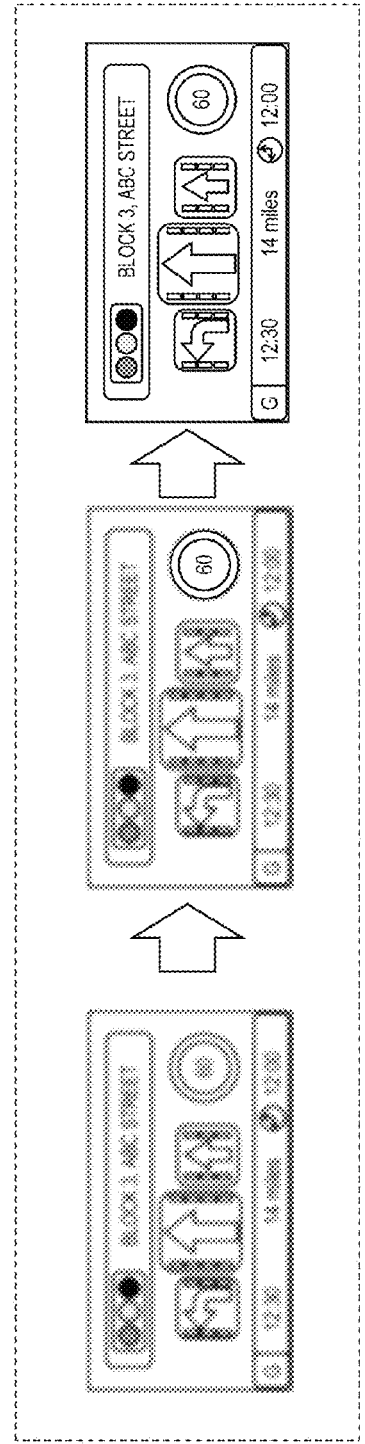

FIG. 12A and FIG. 12B illustrate the sharpness lowering operation and the sharpness recovery operation of the second embodiment of the disclosure. FIG. 12A illustrates the sharpness lowering operation. The driver looking at the display medium 140 may now quickly need to carefully look forward ahead of the vehicle. With reference to FIG. 12A, a uniform transition time is set to be on all display items, thereby dropping the sharpness of all the display items. FIG. 12B illustrates the sharpness recovery operation. With reference to FIG. 12B, the sharpness of the drive support information that is of value to the driver is recovered more quickly than other information.

The drive support system of the second embodiment recovers the sharpness of a display item having a higher degree of importance (drive support information) earlier than the sharpness of other display items. In this way, when the driver looks at the display medium 140 in a state that the driver's need to carefully look forward ahead of the vehicle is not very high, the driver is relieved from the inconvenience that information of a high degree of importance remains invisible because the sharpness is not recovered.

In the second embodiment, the sharpness recovery operation is modified depending on the information type of the display item. The transition time of character information as a display item is set to be shorter to quickly recover the sharpness thereof in the display method of the display item.

If the display item information is character information in the sharpness lowering operation, the target sharpness of the character information is set to be lower (with a higher degree of blurriness) than icons, and the visibility of the character information is decreased. The effect of advising the driver to look forward ahead of the vehicle with care is thus enhanced.

Third Embodiment

Figure 13:
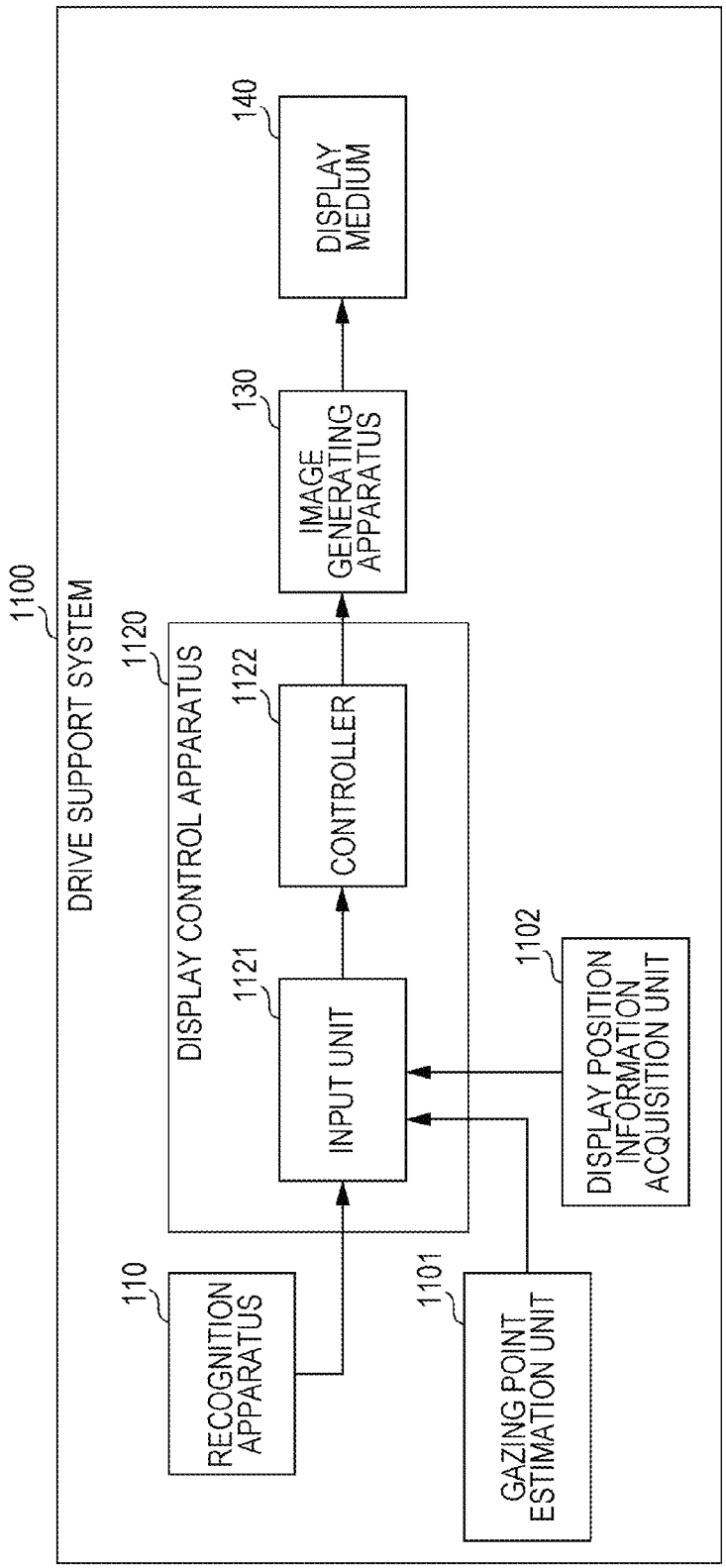
FIG. 13 is a block diagram illustrating a drive support system of a third embodiment of the disclosure.

FIG. 13 is a block diagram illustrating a drive support system 1100 of a third embodiment of the disclosure. The drive support system 1100 of FIG. 13 is different from the drive support system 100 of FIG. 1 in that the drive support system 1100 includes a gazing point estimation unit 1101, and a display position information acquisition unit 1102, these elements newly added, and a display control apparatus 1120 in place of the display control apparatus 120. The display control apparatus 1120 includes an input unit 1121 in place of the input unit 121 and a controller 1122 in place of the controller 122.

Figure 14:
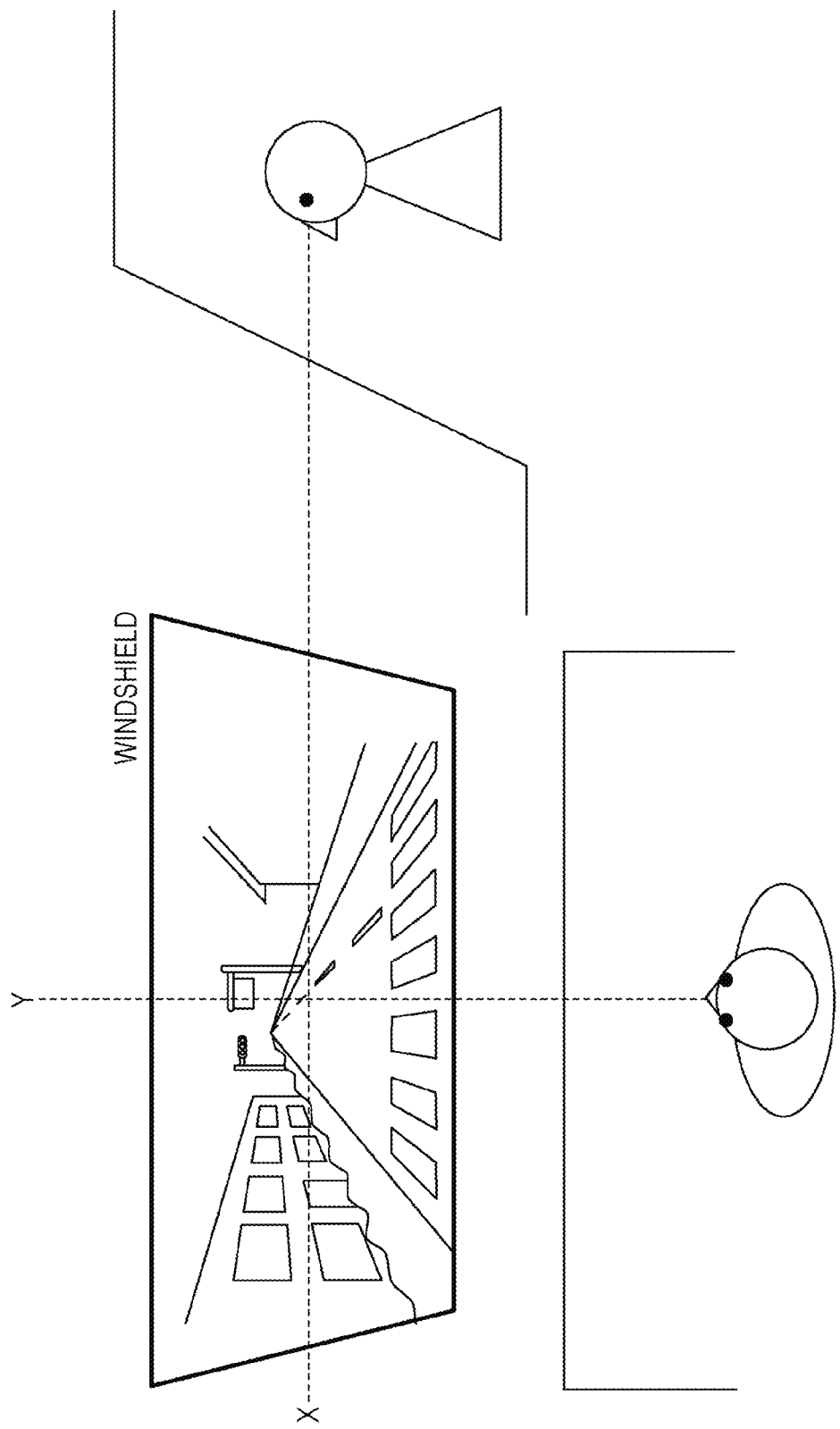
FIG. 14 illustrates a coordinate system referenced to the head position of a driver.

The gazing point estimation unit 1101 estimates a point the driver is advised to look at with care during driving (hereinafter referred to as referred to a "gazing point"), and outputs the gazing point to the input unit 1121. Since the driver typically drives the vehicle while looking forward ahead of the vehicle, the driver simply regards a vanishing point of the foreground image as the gazing point. As illustrated in FIG. 14, the gazing point is in predetermined coordinates in a coordinate system constructed of a horizontal angle and a vertical angle in degrees with reference to the head position of the driver.

Figure 15:
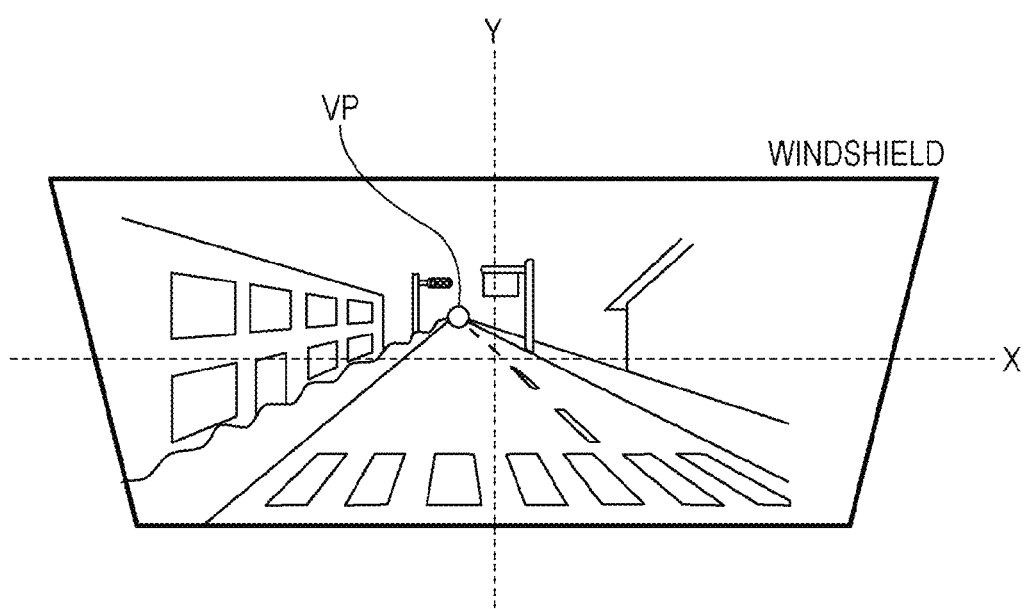
FIG. 15 illustrates an example of a gazing point.

FIG. 15 illustrates an example of the gazing point. The vanishing point calculated through a related art technique, such as optical flow technique, is used for the gazing point. In such a case, the vanishing point coordinates is represented by (X_VP, Y_VP). X_VP represents a horizontal angle, and Y_VP represents a vertical angle. Since the driver is typically driving while looking forward ahead of the vehicle, the gazing point estimation unit 1101 may simplify the operation thereof by using a predetermined fixed point as the vanishing point coordinates. Alternatively, the gazing point estimation unit 1101 may use as the gazing point the vanishing point of the image that is estimated from steering information of the vehicle.

The display position information acquisition unit 1102 segments the displayed image into multiple regions (in terms of the vertical direction or horizontal direction). The image is segmented into regions (hereinafter referred to as "partial regions"). The display position information acquisition unit 1102 acquires the display position information of each partial region, and outputs the display position information to the input unit 1121. For example, the display position information is predetermined coordinates in a coordinate system defined by the horizontal angle and the vertical angle in degrees with reference to the head position of the driver as illustrated in FIG. 14. The display position information may be pre-stored on a memory (not illustrated).

Figure 16:
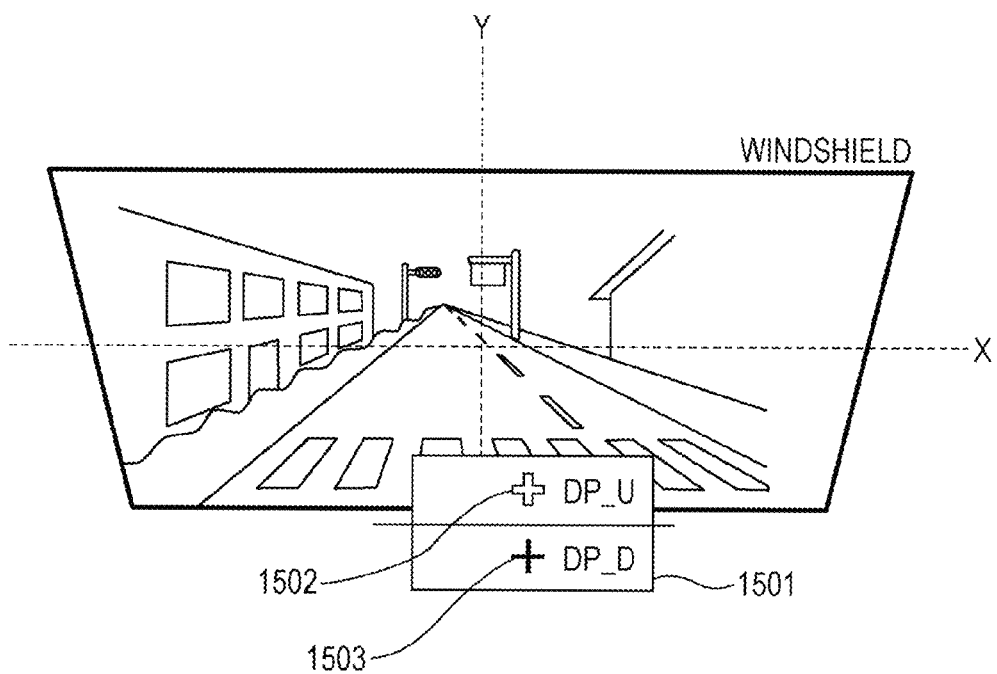
FIG. 16 illustrates position coordinates of each partial region.

FIG. 16 illustrates position coordinates of each partial region. Referring to FIG. 16, HUD 1501 corresponds to the display medium 140, and is mounted in front of the driver's seat. The display area of the HUD 1501 is segmented into an upper region and a lower region. Central coordinates 1502 of the upper partial region (labeled outlined +) represent the position coordinates of the upper partial region, and central coordinates 1503 of the lower partial region (labeled +) represents the position coordinates of the lower partial region.

The input unit 1121 receives the estimation results from the gazing point estimation unit 1101, and the display position information from the display position information acquisition unit 1102. The input unit 1121 then outputs the estimation results and the display position information to the controller 1122.

The controller 1122 calculates a distance between the gazing point coordinates indicated by the estimation results output from the gazing point estimation unit 1101 and the position coordinates indicated by the display position information of the partial region output from the display control apparatus 1120. More specifically, the controller 1122 calculates a distance D1 in degrees between the vanishing point VP(X_VP, Y_VP) of FIG. 15 and the center coordinates 1502 (X_DPU, Y_DPU) of the upper partial region of FIG. 16, and a distance D2 in degrees between the vanishing point VP(X_VP, Y_VP) of FIG. 15 and the center coordinates 1503 (X_DPD, Y_DPD) of the lower partial region of FIG. 16 (see FIG. 17). The controller 1122 sets the target sharpness of the partial region to be lower and sets the transition time to be shorter as the distance from the gazing point is longer. Concerning a display image displayed close to the gazing point, the target sharpness thereof is set to be relatively higher, and the transition time is set to be relatively longer.

If the sharpness of the display image close to the gazing point sharply drops, the driver looking forward ahead of the vehicle may notice the change in the display, which could distract the drive's attention to the forward direction ahead of the vehicle. With the above setting, the display control apparatus 1120 controls the sudden change in the display and keeps the driver from paying over-attention to the display image.

In the third embodiment, a projection apparatus may be configured including at least the display control apparatus 1120 and the image generating apparatus 130. The projection apparatus may further include the display medium 140.

The sharpness lowering operation performed by the display control apparatus 1120 is described with reference to FIG. 18.

The input unit 1121 receives estimation results of the gazing point from the gazing point estimation unit 1101 (step S1301), and receives position coordinates of each partial region of the display image from the display position information acquisition unit 1102 (step S1302). The input unit 1121 outputs the received estimation results of the gazing point and position coordinates of each partial region to the controller 1122.

The controller 1122 calculates a distance between the gazing point and the position coordinates of each partial region (step S1303), and sets the target sharpness and the transition time on each partial region in accordance with the calculated distance (step S1304).

The image generating apparatus 130 generates the transition image of each partial region on the way from the current display image to the target image (step S1305). The transition image may be generated using a technique, such as a blending that blends the current display image and the target image at a predetermined ratio on each partial region.

The image generating apparatus 130 combines the transition images generated on the partial regions into a single display image (step S1306), outputs the combined image to the display medium 140 (step S1307), and determines whether the longest transition time T_transition from among the transition times T_transition set for the partial regions from the start of the generation of the partial image has elapsed (step S1308). If the longest transition time T_transition has not elapsed (no branch from step S1308), processing returns to step S1305. If the longest transition time T_transition has elapsed (yes branch from step S1308), the controller 1122 ends the sharpness lowering operation.

Figure 19A:
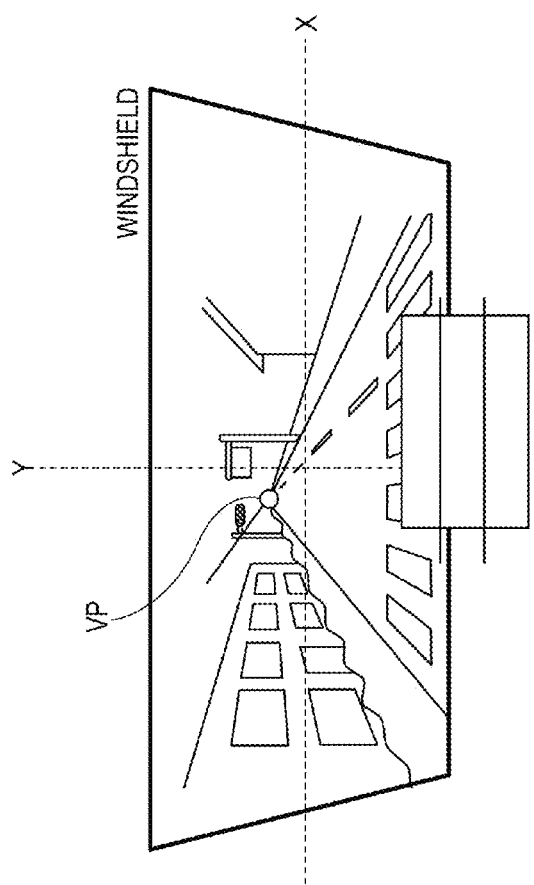
FIG. 19A and FIG. 19B illustrate an example of the sharpness lowering operation in accordance with the third embodiment of the disclosure.
Figure 19B:
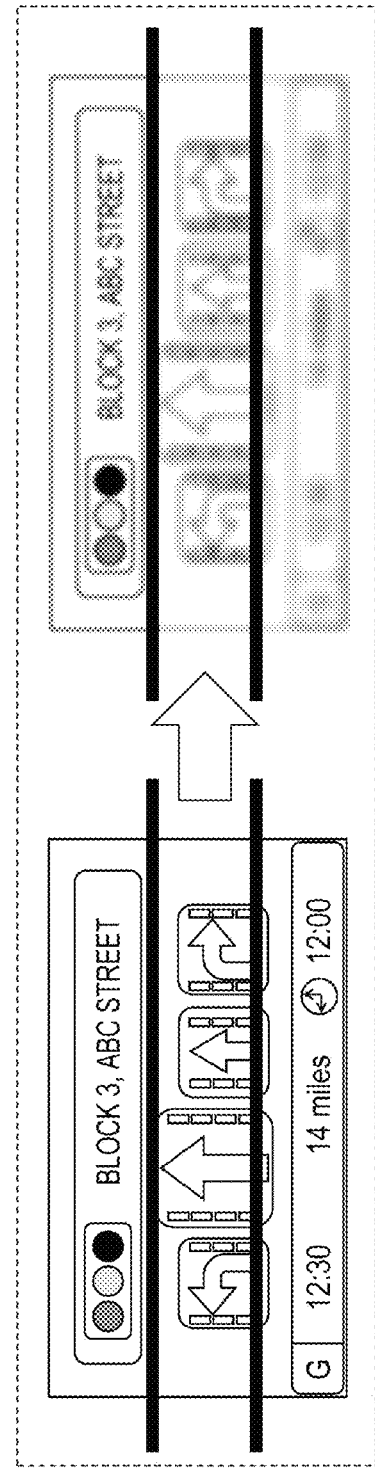

FIG. 19A and FIG. 19B illustrate an example of the sharpness lowering operation in accordance with the third embodiment of the disclosure. Referring to FIG. 19A and FIG. 19B, the display image is segmented into three partial regions including an upper region, a center region, and a lower region (see FIG. 19A). As it is farther away from the gazing point VP, the target sharpness is set to be lower as illustrated in FIG. 19B. The sharpness of the partial region closest to the gazing point is the highest value, the sharpness at the partial region apart most from the gazing point is the lowest value, and the sharpness of the partial region at the center is an intermediate value.

The drive support system 1100 of the third embodiment segments the display image into multiple regions, sets the target sharpness to be lower or sets the transition time to be shorter as the position coordinates of a segmented partial region are farther from the gazing point, sets the target sharpness to be higher or sets the transition time to be longer as the position coordinates of a segmented partial region are closer to the gazing point. If the display medium 140 having a large screen size is mounted in front of the driver, the driver looking forward ahead of the vehicle is free from paying attention to the change in the display. The driver paying attention to the display medium 140 may thus notice the change in the image. The drive support system 1100 thus frees the driver from paying attention to a sudden display change, such as a sudden disappearance of display contents on the display medium 140, definitely annoying to the driver. This contributes to safety driving.

Fourth Embodiment

Figure 20:
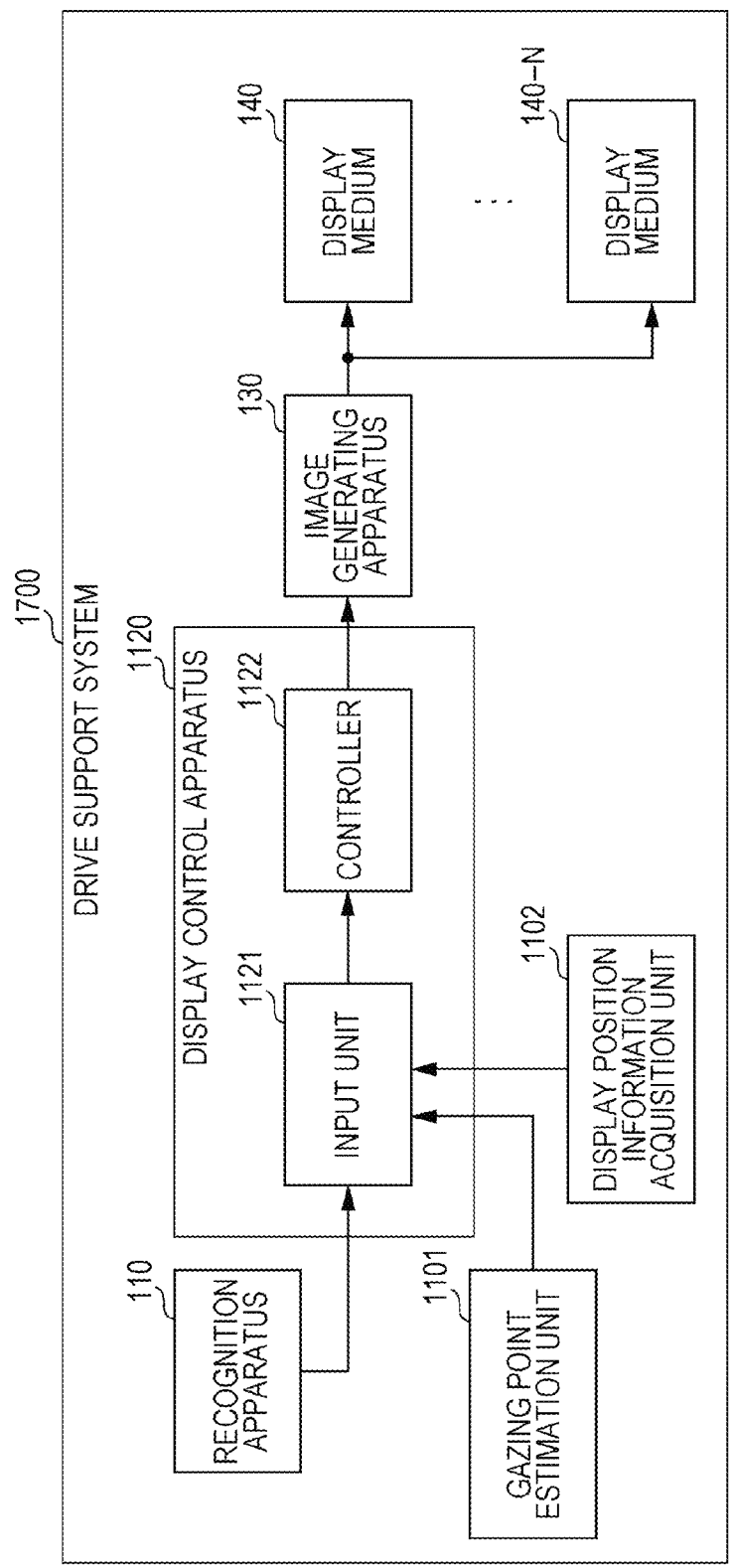
FIG. 20 is a block diagram illustrating a configuration of a drive support system of a fourth embodiment of the disclosure.

FIG. 20 is a block diagram illustrating a configuration of a drive support system 1700 of a fourth embodiment of the disclosure. The drive support system 1700 of FIG. 20 is different from the drive support system 1100 of the third embodiment of FIG. 13 is that multiple display media 140-1 through 140-N are employed in place of the display medium 140.

The display media 140-1 through 140-N are multiple on-board displays including a head-up display, a meter display, and a center display. FIG. 21 illustrates an example of the display media 140-1 through 140-N.

The display position information acquisition unit 1102 acquires position information of the display media 140-1 through 140-N and outputs the acquired position information to the input unit 1121. For example, the position information may be pre-stored on a memory (not illustrated).

The input unit 1121 receives the position information of the display media 140-1 through 140-N, and then outputs the received position information to the controller 1122.

The controller 1122 determines the target sharpness and the transition time of each display medium based on the position information of the display media 140-1 through 140-N. More specifically, as the partial regions of the third embodiment are replaced with the display media, the controller 1122 calculates the distance between the gazing point coordinates and the position information of the display medium, sets the target sharpness of the display image to be lower or sets the transition time to be shorter as the distance from the gazing point is longer.

In the fourth embodiment, a projection apparatus may be configured including at least the display control apparatus 1120 and the image generating apparatus 130. The projection apparatus may further include the display media 140-1 through 140-N.

The sharpness lowering operation of the display control apparatus 1120 is described with reference to FIG. 22. FIG. 22 is a flowchart illustrating the sharpness lowering operation of the display control apparatus 1120 of the fourth embodiment of the disclosure. In FIG. 22, elements similar to those illustrated in FIG. 18 are designated with the same reference numerals and the discussion thereof is not repeated.

The input unit 1121 receives the position information of the display media 140-1 through 140-N from the display position information acquisition unit 1102 (step S1901). The position information of the display medium indicates coordinates of the center of the screen of the head-up display, the meter display, or the center display. The input unit 1121 outputs the received position information of the display medium to the controller 1122.

The controller 1122 calculates the distance between the gazing point and each display medium in accordance with the position information of each display medium (step S1902), and sets the target sharpness and the transition time of each of the display media 140-1 through 140-N (step S1903).

The image generating apparatus 130 generates the transition image that reaches the target sharpness with the predetermined transition time of each of the display media 140-1 through 140-N (step S1904), and outputs the generated transition image to the display media 140-1 through 140-N (step S1905).

Figure 23A:
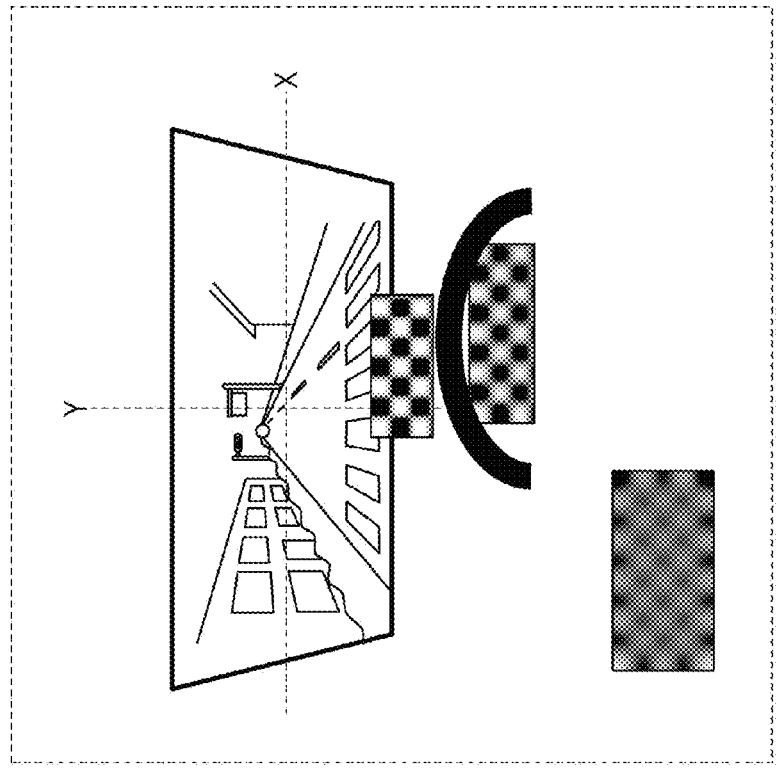
FIG. 23A and FIG. 23B illustrate an example of the sharpness lowering operation of in accordance with the fourth embodiment of the disclosure.
Figure 23B:
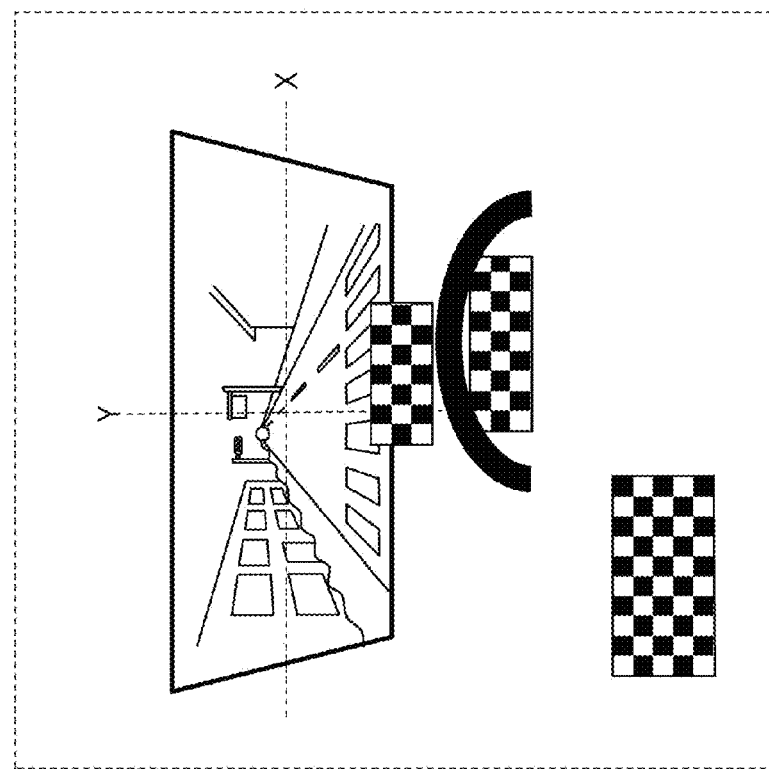

FIG. 23A and FIG. 23B show the sharpness lowering operation of the fourth embodiment of the disclosure. FIG. 23B illustrates a display example in which the target sharpness is set to be lower as a display is placed farther from the gazing point. More specifically, the sharpness of the display closest to the gazing point is set to be the highest value while the sharpness of the display farthest from the gazing point is set to be the lowest value. The sharpness of the display in the intermediate distance is set to be an intermediate value.

The drive support system 1700 of the fourth embodiment thus includes the multiple display media 140-1 through 140-N. The target sharpness is set to be lower or the transition time is set to be shorter as the display medium is farther from the gazing point. The target sharpness is set to be higher or the transition time is set to be longer as the display medium is closer to the gazing point. This leaves a driver who has carefully looked forward ahead of the vehicle unaware of the change in the image, while causing a driver who has looked at the display medium 140 to carefully look forward ahead of the vehicle. The drive support system 1700 is thus free from an annoying display change, such as a sudden disappearance of the display contents. The drive support system 1700 thus keep the driver from paying over-attention to the display media 140-1 through 140-N and contributes to safety driving.

Figure 24:
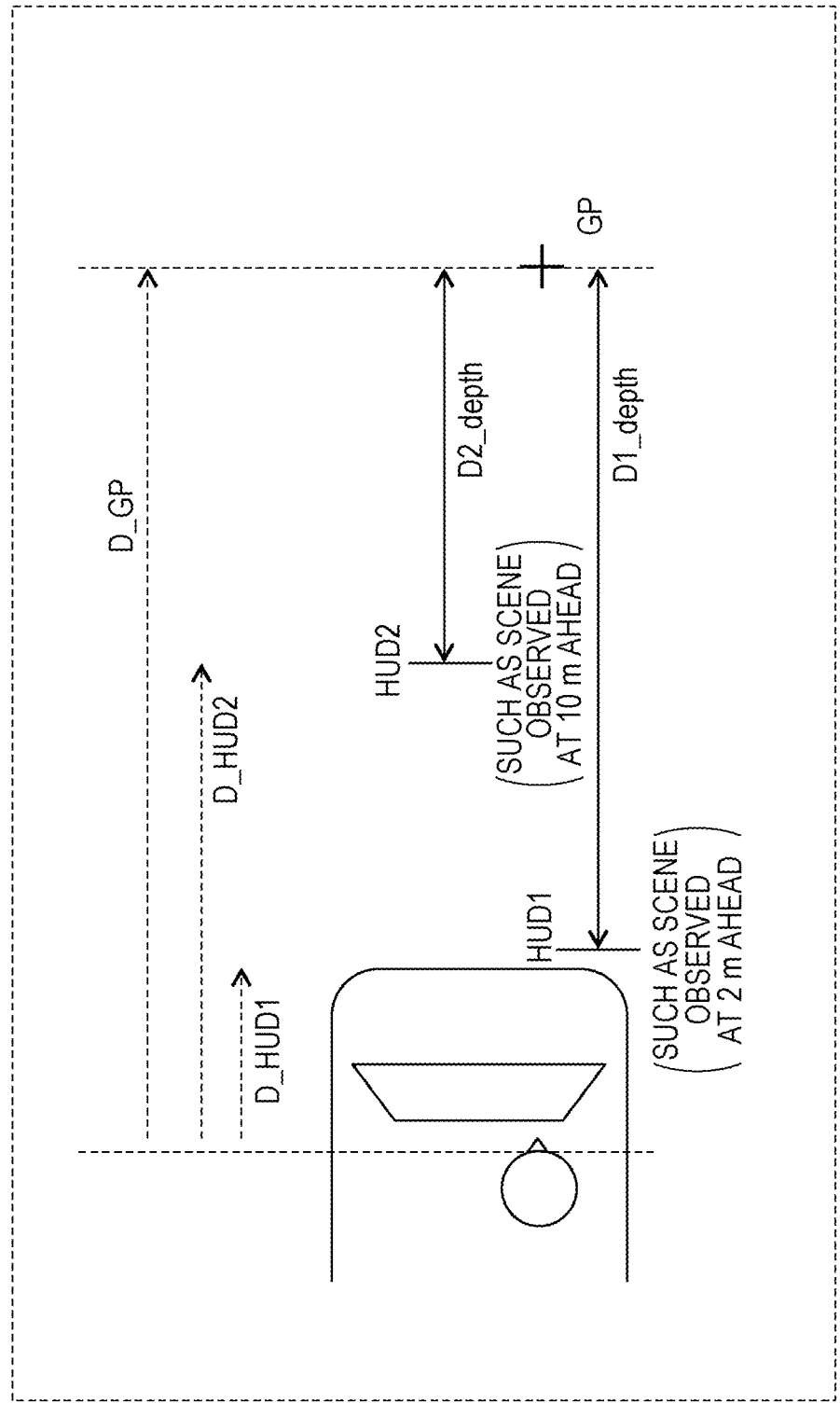
FIG. 24 illustrates a distance in a direction of depth.

In the fourth embodiment, the distance of the display medium is calculated in accordance with the coordinate system defined by the vertical angle and the horizontal angle with reference to the gazing point of the driver as the center. The distance in the direction of depth may be accounted for. As illustrated in FIG. 24, for example, the gazing point estimation unit 1101 may store as a predetermined value a distance D_GP in meters in the direction of depth from the driver to the gaze point at which the user is to look.

Distances D_HUD1 and D_HUD2 from the driver to the apparent locations where the display image appears to be displayed on the HUD are acquired by the display position information acquisition unit 1102. Referring to FIG. 24, the driver feels that the display image HUD1 is displayed at 2 meters ahead, and that the display image HUD2 is displayed at 10 meters ahead. The controller 1122 calculates the difference between D_GP and each of D_HUD1 and D_HUD2, thereby calculating the distances D1_depth and D2_depth in meters in the direction of depth between the gazing point and the locations where the display image appears to be displayed on the HUD.

Figure 17:
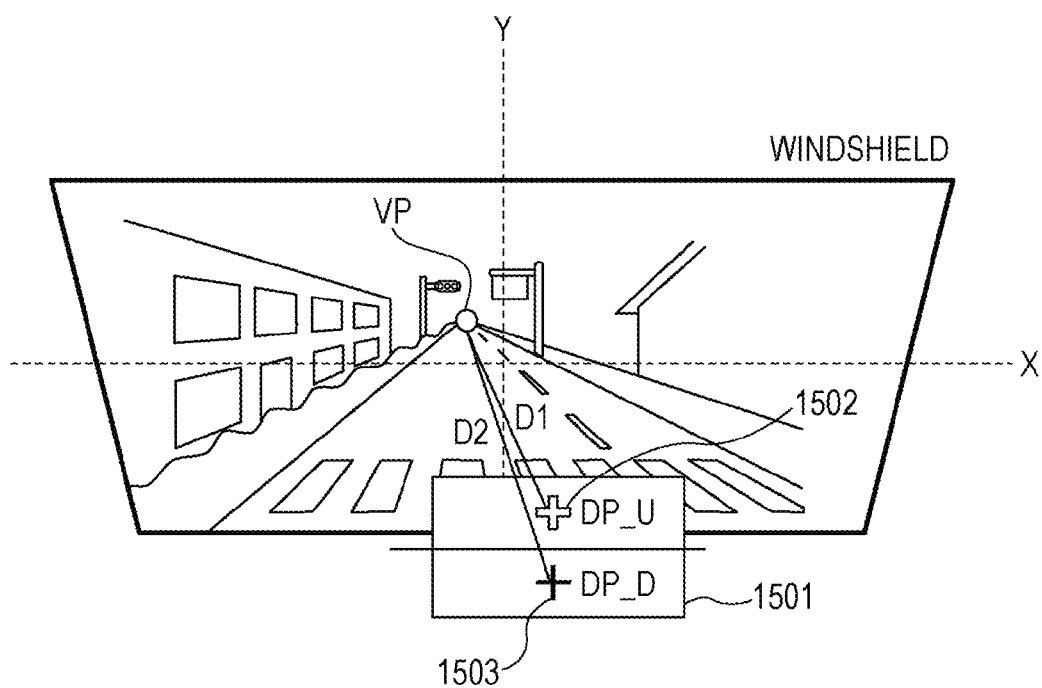
FIG. 17 illustrates a distance between the gazing point and position coordinates of each partial region.

As illustrated in FIG. 17, the controller 1122 calculates distances D1 and D2 to the gazing point in the vertical angle and the horizontal angle, and calculates a distance in the direction of depth using distances D1_depth and D2_depth in the direction of depth. D1 and D2 in degrees are different from D1_depth and D2_depth in meters in terms of unit. These values may be normalized by dividing the values by a predetermined reference value d (such as 90°) and d_depth (such as 100 meters). By summing the distances, the distance in the direction of depth may be calculated. More specifically, the distance D between the gazing point and HUD1 is calculated in accordance with the following Formula.

$$D = D1/d + D1\_depth/d\_depth$$

Figure 25:
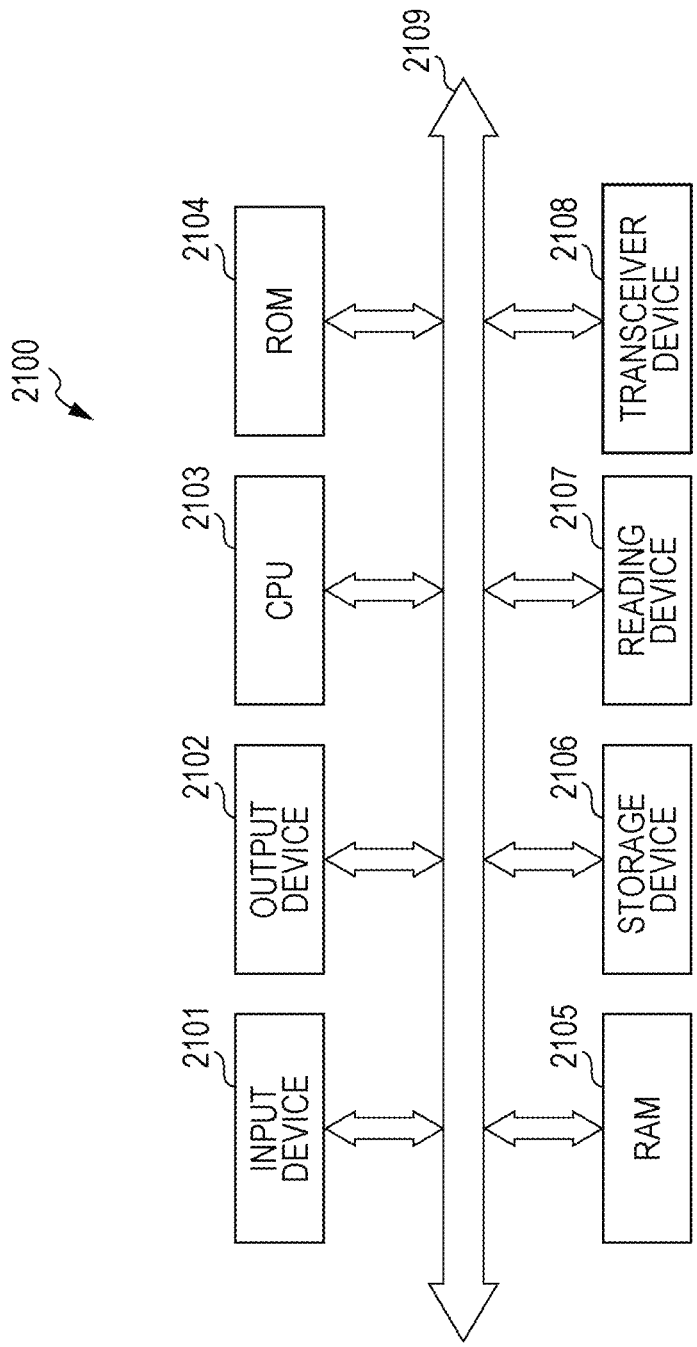
FIG. 25 illustrates a hardware configuration of a computer that implements the function of each element using a program.

FIG. 25 illustrates a hardware configuration of a computer 2100 that implements the function of each element of the embodiments using a program. The computer 2100 includes an input device 2101, such as a button or a touchpad, an output device 2102, such as a display or a loudspeaker, a central processing unit (CPU) 2103, a read-only memory (ROM) 2104, and a random-access memory (RAM) 2105. The computer 2100 further includes a storage device 2106, such as a hard disk or a solid state drive (SSD), a reading device 2107 that reads information from a recording medium, such as a digital versatile disk read only memory (DVD-ROM), or a universal serious bus (USB) memory, and a transceiver device 2108 that communicates via a network. These elements are interconnected via a bus 2109.

The reading device 2107 reads the program from the recording medium that records the program that implements the function of each unit, and causes the storage device 2106 to store the program. Alternatively, the transceiver device 2108 communicates with a server apparatus connected to a network, and causes the storage device 2106 to store the program downloaded from the server apparatus and implementing the function of each element.

The CPU 2103 copies the program from the storage device 2106 to the RAM 2105, and successively reads instructions included in the program from the RAM 2105, and executes the instructions. The function of each element is this performed. When the program is executed, information acquired in the operations described above are stored on the RAM 2105 or the storage device 2106 and then used as appropriate.

In the discussion of the embodiments, the drive support system is applied to a vehicle. The disclosure is not limited to this application. The disclosure finds applications in a drive support system in a moving object, such as a ship and aircraft.

The display control apparatus, the projection apparatus, the display control method, and the non-transitory computer readable medium, related to the disclosure, are free from an annoying display change, such as a sudden disappearance of the display contents, and contributes to safety driving.

What is claimed is:

1. A display control apparatus comprising:
   an inputter that receives recognition results of an object appearing around a vehicle; and
   a processor that sets a target sharpness of an image to be displayed on a display, and generates a control signal and outputs the control signal to an image generating apparatus, the control signal controlling the image generating apparatus in a manner such that an image sharpness gradually lowers from a first presentation image to a second presentation image lower in image sharpness than the first presentation image on the display during a predetermined duration of time, based on the received recognition results, the image generating apparatus generating a predetermined image corresponding to the first presentation image to be displayed on the display,
   wherein
   the processor lowers the target sharpness below a sharpness of an original image when the processor determines that a driver is to carefully look forward to ahead of the vehicle, and returns the lowered sharpness back to the sharpness of the original image when the processor determines that the driver is not to carefully look forward to ahead of the vehicle,
   display items displayed on the display are classified according to information types and display forms, the information types include a drive guide information type, a drive support information type, and a service information type, and the display forms includes an icon form and a character form,
   the processor sets a return time for returning the lowered sharpness back to the sharpness of the original image for a display item displayed on the display, and
   the return time of each of the display items of the character form is set to be shorter than each of the display items of the icon form, or the return time of each of the display items of the drive support information type is set to be shorter than each of the display items of the information types other than the drive support information type.

2. The display control apparatus according to claim 1, wherein the processor determines that the driver is to carefully look forward ahead of the vehicle while driving the vehicle if a time for colliding with another vehicle present ahead or a distance to the other vehicle present ahead is lower than a predetermined value.

3. The display control apparatus according to claim 1, wherein the processor sets the predetermined duration of time to be shorter as a rate of change in time for colliding with another vehicle present ahead or a rate of change in a distance to the other vehicle present ahead is higher.

4. The display control apparatus according to claim 1, wherein the processor calculates a distance between a gazing point the driver is to focus on and a display image, and sets the target sharpness to be lower or sets the predetermined duration of time to be shorter as the calculated distance is longer.

5. The display control apparatus according to claim 4, wherein the processor calculates a distance between the gazing point and a partial region into which the image is segmented, and sets the target sharpness to be lower or sets the predetermined duration of time to be shorter as the calculated distance is longer.

6. The display control apparatus according to claim 4, wherein the processor calculates a distance between the gazing point and each of images displayed on a plurality of displays, and sets the target sharpness to be lower or sets the predetermined duration of time to be shorter as the calculated distance is longer.

7. The display control apparatus according to claim 1, wherein the object appearing around the vehicle includes at least one of a moving object or a structure on a road.

8. The display control apparatus according to claim 1, wherein the first presentation image is displayed when the recognition results indicate that the object is at a first distance from the vehicle, and the second presentation image is displayed when the recognition results indicate that the object is at a second distance from the vehicle, and
wherein the first distance is greater than the second distance.

9. The display control apparatus according to claim 1, wherein the image sharpness of the first presentation image is gradually lowered to the second presentation image as the vehicle approaches closer to the object.

10. The display control apparatus according to claim 1, wherein drive support information indicated by the drive support information type is information the driver uses to check periodically for driving, or information the driver uses to respond within a reference period of time.

11. The display control apparatus according to claim 10, wherein drive support information indicated by the drive support information type includes traffic information containing traffic congestion information or accident information, and information about intersections known for traffic accidents.

12. The display control apparatus according to claim 1, wherein the target sharpness of each of the display items of the character form is set to be lower than each of the display items of the icon form.

13. The display control apparatus according to claim 1, when the processor determines that the object is within a reference distance of the vehicle to be identified as a potential collision risk, the processor lowers the target sharpness below the sharpness of the original image, and
when the processor determines that the object is beyond of the reference distance of the vehicle to be identified as a non-collision risk, the processor returns the lowered sharpness back to the sharpness of the original image.

14. A projection apparatus comprising:
an image generator that generates a predetermined image and outputs the predetermined image to a display;
an inputter that receives recognition results of an object appearing around a vehicle; and
a processor that sets a target sharpness of the predetermined image to be displayed on the display, and controls the image generator such that the image generator generates a first predetermined image corresponding to a first presentation image displayed on the display,
wherein
the processor further controls the image generator such that an image sharpness gradually lowers from the first presentation image to a second presentation image lower in image sharpness than the first presentation image on the display during a predetermined duration of time, based on the recognition results,
the processor lowers the target sharpness below a sharpness of an original image when the processor determines that a driver is to carefully look forward to ahead of the vehicle, and returns the lowered sharpness back to the sharpness of the original image when the processor determines that the driver is not to carefully look forward to ahead of the vehicle,
display items displayed on the display are classified according to information types and display forms, the information types include a drive guide information type, a drive support information type, and a service information type, and the display forms includes an icon form and a character form,
the processor sets a return time for returning the lowered sharpness back to the sharpness of the original image for a display item displayed on the display, and
the return time of each of the display items of the character form is set to be shorter than each of the display items of the icon form, or the return time of each of the display items of the drive support information type is set to be shorter than each of the display items of the information types other than the drive support information type.

15. A display control method:
receiving recognition results of an object appearing around a vehicle;
setting, by a processor, a target sharpness of an image to be displayed on a display;
generating, by the processor, a control signal for controlling an image generating apparatus in a manner such that an image sharpness gradually lowers from a first presentation image to a second presentation image lower in image sharpness than the first presentation image on the display during a predetermined duration of time, based on the received recognition results, the image generating apparatus generating a predetermined image corresponding to the first presentation image to be displayed on the display; and
outputting, by the processor, to the control signal to the image generating apparatus,
wherein the processor lowers the target sharpness below a sharpness of an original image when the processor determines that a driver is to carefully look forward to ahead of the vehicle, and returns the lowered sharpness back to the sharpness of the original image when the processor determines that the driver is not to carefully look forward to ahead of the vehicle, display items displayed on the display are classified according to information types and display forms, the information types include a drive guide information type, a drive support information type, and a service information type, and the display forms includes an icon form and a character form, the processor sets a return time for returning the lowered sharpness back to the sharpness of the original image for a display item displayed on the display, and the return time of each of the display items of the character form is set to be shorter than each of the display items of the icon form, or the return time of each of the display items of the drive support information type is set to be shorter than each of the display items of the information types other than the drive support information type.

16. A non-transitory computer readable storing a display control program causing a computer to execute a process in a display control apparatus in a display system including a recognition apparatus that recognizes a change in an environment surrounding a vehicle and an image generating apparatus, the process comprising:

receiving recognition results, from the recognition apparatus, of an object appearing around the vehicle;

setting, by a processor, a target sharpness of an image to be displayed on a display;

generating, by the processor, a control signal for controlling the image generating apparatus in a manner such that an image sharpness gradually lowers from a first presentation image to a second presentation image lower in image sharpness than the first presentation image on the display during a predetermined duration of time, based on the received recognition results, the image generating apparatus generating a predetermined image corresponding to the first presentation image to be displayed on the display; and outputting, by the processor, to the control signal to the image generating apparatus, wherein the processor lowers the target sharpness below a sharpness of an original image when the processor determines that a driver is to carefully look forward to ahead of the vehicle, and returns the lowered sharpness back to the sharpness of the original image when the processor determines that the driver is not to carefully look forward to ahead of the vehicle, display items displayed on the display are classified according to information types and display forms, the information types include a drive guide information type, a drive support information type, and a service information type, and the display forms includes an icon form and a character form, the processor sets a return time for returning the lowered sharpness back to the sharpness of the original image for a display item displayed on the display, and the return time of each of the display items of the character form is set to be shorter than each of the display items of the icon form, or the return time of each of the display items of the drive support information type is set to be shorter than each of the display items of the information types other than the drive support information type.

* * * * *